(12) United States Patent
Kim et al.

(10) Patent No.: US 11,138,955 B2
(45) Date of Patent: Oct. 5, 2021

(54) ELECTRONIC DEVICE AND METHOD FOR CONTROLLING FLEXIBLE DISPLAY

(71) Applicant: Samsung Electronics Co., Ltd., Gyeonggi-do (KR)

(72) Inventors: Jinik Kim, Gyeonggi-do (KR); Seongmin Je, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/844,651

(22) Filed: Apr. 9, 2020

(65) Prior Publication Data

US 2020/0335063 A1    Oct. 22, 2020

(30) Foreign Application Priority Data

Apr. 19, 2019   (KR) .................. 10-2019-0046290

(51) Int. Cl.
*G09G 5/14* (2006.01)

(52) U.S. Cl.
CPC ............ *G09G 5/14* (2013.01); *G09G 2320/10* (2013.01); *G09G 2354/00* (2013.01); *G09G 2380/02* (2013.01)

(58) Field of Classification Search
CPC .............. G06F 1/1652; G06F 2203/04803
See application file for complete search history.

(56) References Cited

U.S. PATENT DOCUMENTS

| 2013/0222271 A1 | 8/2013 | Alberth et al. |
| 2014/0028596 A1* | 1/2014 | Seo .............. G06F 3/0487 345/173 |
| 2014/0029017 A1 | 1/2014 | Lee et al. |
| 2015/0026647 A1 | 1/2015 | Park et al. |

(Continued)

FOREIGN PATENT DOCUMENTS

| JP | 2016-177568 | 10/2016 |
| KR | 1020170097521 | 8/2017 |

OTHER PUBLICATIONS

International Search Report dated Jul. 22, 2020 issued in counterpart application No. PCT/KR2020/005060, 9 pages.

*Primary Examiner* — Todd Buttram
(74) *Attorney, Agent, or Firm* — The Farrell Law Firm, P.C.

(57) ABSTRACT

An electronic device includes flexible display; at least one sensor; at least one processor connected to the flexible display and the at least one sensor; and a memory connected to the at least one processor, wherein the memory stores instructions which, when executed, cause the at least one processor to identify wearing state information of the electronic device and/or bending state information of the electronic device by using the at least one sensor; display first object information on a first display area of the flexible display, based on at least the identified wearing state information and/or bending state information; identify a situation change of the electronic device by the at least one sensor; in response to identifying the situation change, acquire situation information of the electronic device or posture information of the electronic device by using the at least one sensor; and display second object information on a second display area including at least a partial area of the first display area of the flexible display, based on at least the acquired situation information and/or posture information.

18 Claims, 26 Drawing Sheets

(56) References Cited

U.S. PATENT DOCUMENTS

2016/0224305 A1\* 8/2016 Lee ..................... G06F 3/041
2017/0038845 A1\* 2/2017 Chi ................... G06F 3/04845
2017/0160819 A1  6/2017 Yi et al.

\* cited by examiner

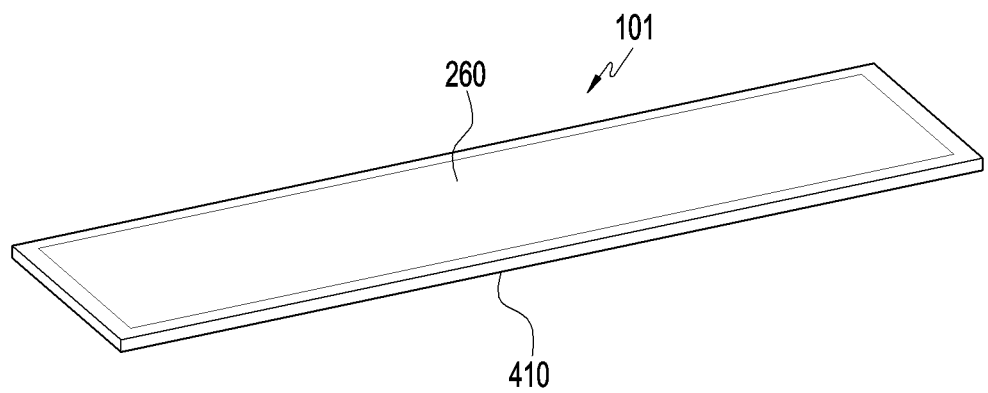
FIG.4A
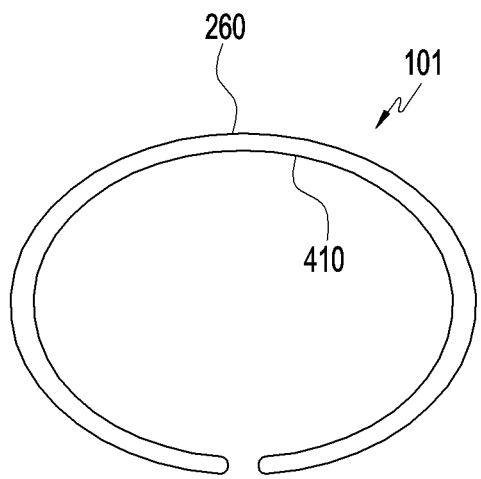 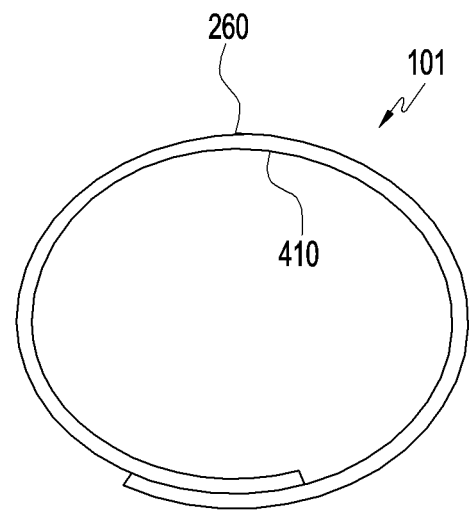
FIG.4B                FIG.4C

ELECTRONIC DEVICE AND METHOD FOR CONTROLLING FLEXIBLE DISPLAY

CROSS-REFERENCE TO RELATED APPLICATION(S)

This application is based on and claims priority under 35 U.S.C. § 119 to Korean Patent Application No. 10-2019-0046290, filed on Apr. 19, 2019, in the Korean Intellectual Property Office, the entire disclosure of which is incorporated herein by reference.

BACKGROUND

1. Field

The disclosure relates generally to an electronic device and a method for controlling a flexible display.

2. Description of Related Art

As the performance of electronic devices is improved, the variety of services and additional functions provided by portable electronic devices such as smartphones is gradually expanding. In order to increase the utility of an electronic device and satisfy various needs of users, electronic device manufacturers or communication service providers are competitively developing electronic devices providing a greater variety of functions and designed in various forms in order to distinguish the same from those of other companies.

Recently, in order to meet the needs of users who want new and more various functions, a flexible electronic device employing a flexible display that can be deformed like paper has been developed and commercialized. The flexible display may be bent, folded, or rolled by a user's force, and may provide various visual information to the user by outputting a content such as a text or an image while temporarily maintaining the shape of the flexible display.

A flexible electronic device may be developed into a wearable electronic device worn on the body using the characteristic of being capable of being deformed into various forms. Such a wearable electronic device may be implemented in the form of a wrist watch worn on the wrist of a user to make it easy for the user to wear the wearable electronic device and to use both hands freely.

SUMMARY

An aspect of the disclosure provides an electronic device and a method for controlling a flexible display, in which the electronic device and the method may selectively determine a display area according to a shape change of a flexible electronic device and a user's situation, and may display object information through the determined display area.

According to an aspect of the disclosure, an electronic device is provided. The electronic device includes a flexible display; at least one sensor; at least one processor functionally connected to the flexible display and the at least one sensor; and a memory functionally connected to the at least one processor, wherein the memory is configured to store instructions which, when executed, cause the at least one processor to identify wearing state information of the electronic device and/or bending state information of the electronic device by using the at least one sensor; display first object information on a first display area of the flexible display, based on at least the identified wearing state information and/or bending state information; identify a situation change of the electronic device by the at least one sensor; in response to identifying the situation change, acquire situation information of the electronic device or posture information of the electronic device by using the at least one sensor; and display second object information on a second display area including at least a partial area of the first display area of the flexible display, based on at least the acquired situation information and/or the posture information.

According to another aspect of the disclosure, a non-transient storage medium storing instructions which, when executed by at least one circuit, cause the at least one circuit to perform at least one operation. The at least one operation includes identifying wearing state information of an electronic device and/or bending state information of the electronic device by using at least one sensor; displaying first object information on a first display area of a flexible display, based on at least the identified wearing state information and/or bending state information; identifying a situation change in the electronic device by the at least one sensor; in response to identifying the situation change, acquiring situation information of the electronic device or posture information of the electronic device by using the at least one sensor; and displaying second object information on a second display area including at least a partial area of the first display area of the flexible display, based on at least the acquired situation information and/or the posture information.

According to another aspect of the disclosure, a method for controlling a flexible display is provided. The method includes identifying wearing state information of an electronic device and/or bending state information of the electronic device by using at least one sensor; displaying first object information on a first display area of the flexible display, based on at least the identified wearing state information and/or bending state information; identifying a situation change of the electronic device by the at least one sensor; in response to identifying the situation change, acquiring situation information of the electronic device or posture information of the electronic device by using the at least one sensor; and displaying second object information on a second display area including at least a partial area of the first display area of the flexible display, based on at least the acquired situation information and/or the posture information.

BRIEF DESCRIPTION OF THE DRAWINGS

The above and other aspects, features, and advantages of the certain embodiments of the present disclosure will be more apparent from the following detailed description taken in conjunction with the accompanying drawings, in which:

FIG. 4A illustrates a structure of an electronic device according to an embodiment;

FIGS. 4B and 4C illustrate a structure of an electronic device according to an embodiment;

DETAILED DESCRIPTION

Figure 1:
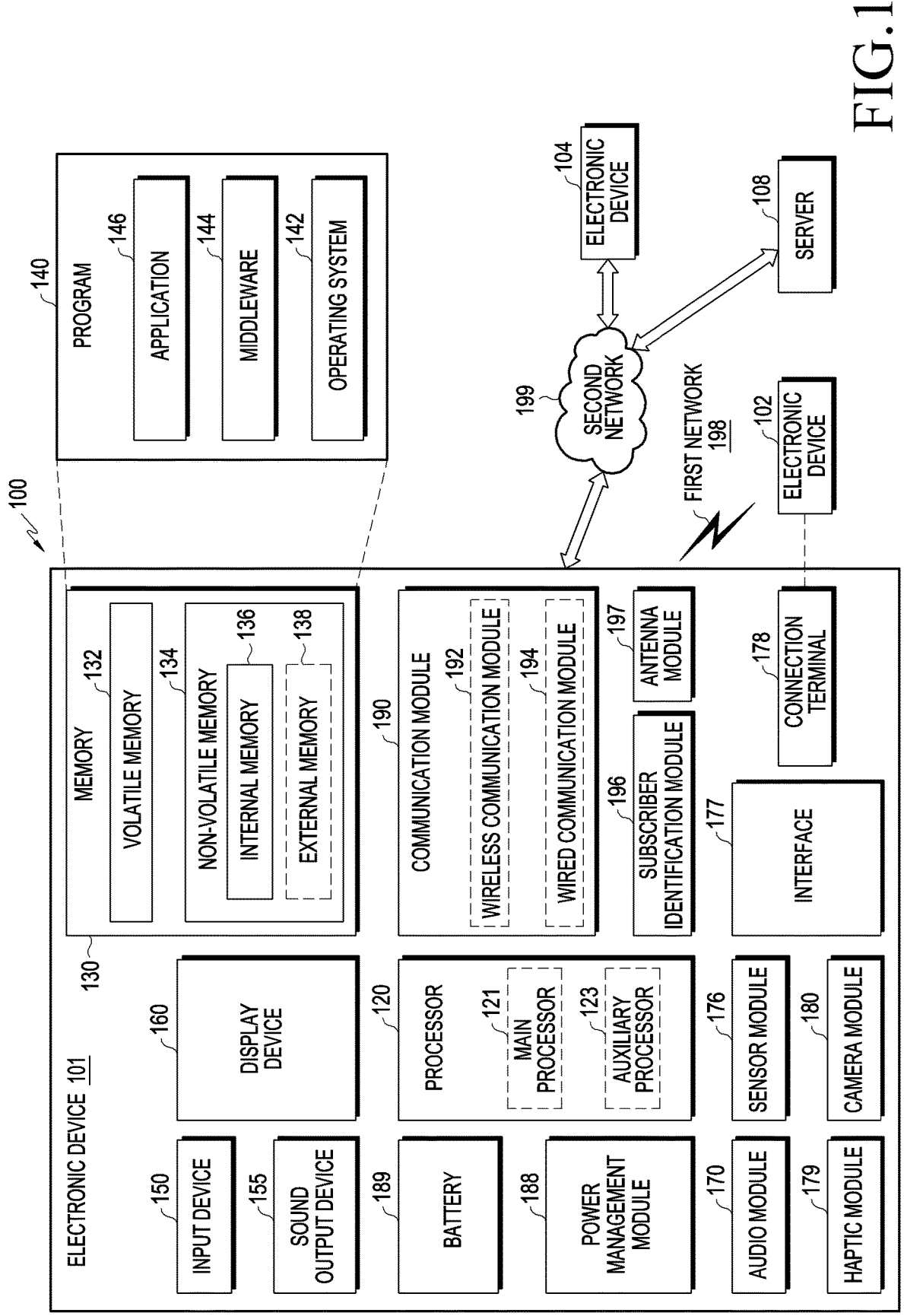
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 388 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless fidelity (WiFi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request.

To that end, a cloud computing, distributed computing, or client-server computing technology may be used, for example.

Figure 2:
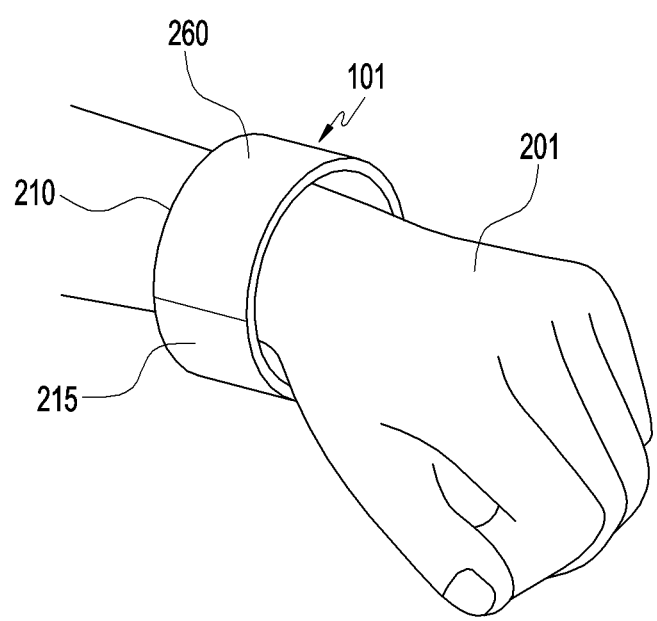
FIG. 2 illustrates an electronic device according to an embodiment.

FIG. 2 is an illustration of an electronic device 101 according to an embodiment. Referring to FIG. 2, the electronic device 101 (or the electronic device 102 or the electronic device 104) may be a wearable electronic device that may be worn on a user's body. For example, the electronic device 101 may be implemented to be worn on the wrist of the left arm 201 or the right arm 202 (see FIG. 8) of the user's body. For example, the electronic device 101 may be implemented in the form of a wristwatch, a bracelet, an ankle bracelet, or a ring.

The electronic device 101 may include a body 210, a strap 215 disposed on both ends of the body 210 to surround and be fastened to the wrist of the user, and a flexible display 260 disposed on one surface of the body 210.

The body 210 of the electronic device 101 has a roughly band-like shape extending in one direction, and the flexible display 260 may be disposed on a first surface thereof, and a second surface may be in contact with the user's body in a direction opposite that faced by the first surface. For example, the body 210 may be bent, folded, or rolled up.

The flexible display 260 of the electronic device 101 may be disposed on a surface that may be exposed to the outside when the body 210 is fastened to the body. The flexible display 260 may be bent, folded, or rolled together with the body 210. For example, the flexible display 260 may include various types, in which the shape of a display may be changed by external force, such as a bendable display that can be bent or unbent at a certain angle or a certain curvature, a foldable display that can be folded or unfolded, or a rollable display that can be rolled into a cylinder shape. The flexible display 260 may be configured as a touch screen including a touch panel.

Figure 3A:
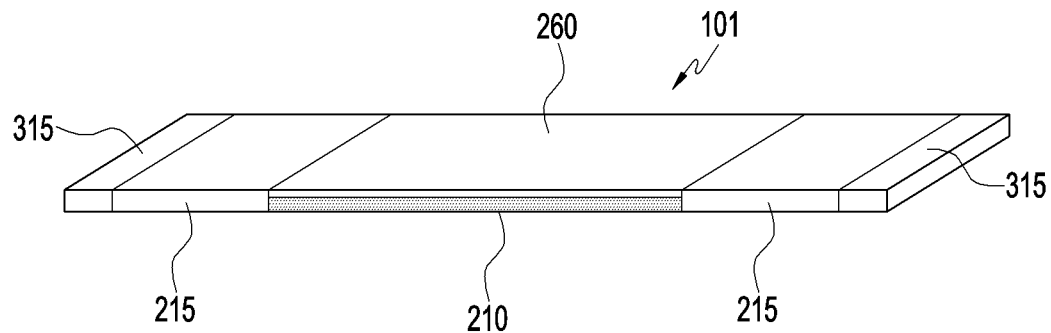
FIG. 3A illustrates a structure of an electronic device according to an embodiment.
Figure 3B:
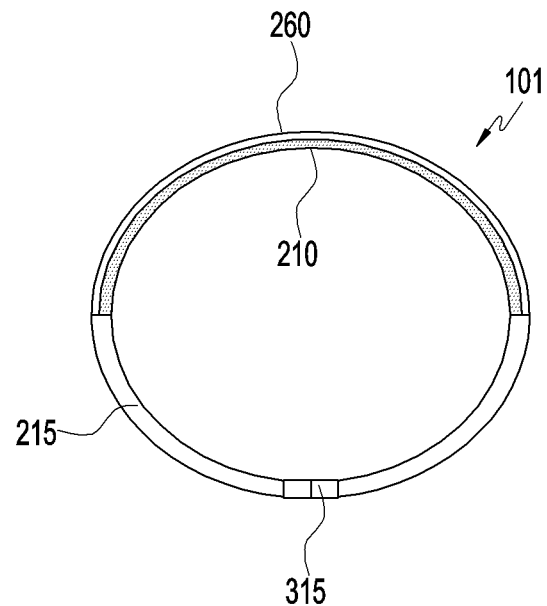
FIG. 3B illustrates a structure of an electronic device according to an embodiment.

FIG. 3A is an illustration of a structure of an electronic device according to an embodiment. FIG. 3B is an illustration of a structure of an electronic device according to an embodiment.

Referring to FIGS. 3A and 3B, the electronic device 101 is shown in FIG. 3A to be roughly flat and shown in FIG. 3B as being worn on the wrist by applying force. For example, the electronic device 101 may operate in a flat state, as shown in FIG. 3A, or in a rolled state, as shown in FIG. 3B.

The electronic device 101 may include a body 210, straps 215 disposed on both ends of the body 210 to surround and be fastened to a user's wrist, a fastening member 315 for fastening opposite ends of the straps 215 where the ends meet each other, and a flexible display 260 disposed on one surface of the body 210.

The fastening member 315 may be implemented as a first magnet in a first end of the strap 215 disposed on one side with reference to the body 210 and a second end of the strap 215 disposed on the other side thereof and having different magnetic properties as compared to the first magnet. The fastening member 315 may be configured in the form of a hook or a buckle.

FIG. 4A is an illustration of a structure of the electronic device 101 according to an embodiment. FIG. 4B is an illustration of a structure of the electronic device 101 according to an embodiment. FIG. 4C is an illustration of a structure of the electronic device 101 according to an embodiment.

Referring to FIGS. 4A, 4B, and 4C, the electronic device 101 is shown in FIG. 4A to be roughly flat, shown in FIGS. 4B and 4C as being worn on the wrist by applying force thereto. For example, the electronic device 101 may operate in a flat state, as shown in FIG. 4A, or in a rolled state, as shown in FIGS. 4B and 4C.

The electronic device 101 may include a body 410, and a flexible display 260 disposed on one surface of the body 410.

The body 410 might not include the strap 215 or the fastening member 315. For example, as illustrated in FIG. 4A, the body 410 may have a roughly bar-like shape extending in one direction, and may be maintained in a flat state, where the flexible display 260 may be formed over all (or most) of one surface of the body 410. The body 410 may include a thin plate made of metal material, and may be maintained in a flat state when there is no external force applied thereto. However, when the body 410 is placed on the wrist and a predetermined force is applied to the direction of wrapping around the wrist, the body 410 is bent in the direction of wrapping around the wrist. For example, as shown in FIGS. 4B and 4C, the body 410 is disposed to wrap around the wrist, and, thus, may be in a state of being worn on the wrist. As shown in FIG. 4B, the body 410 may be configured such that both ends of the body 410 do not contact each other when the body 410 is worn on the wrist. As shown in FIG. 4C, the body 410 may be configured such that both ends of the body 410 are overlappingly rolled on each other when the body 410 is worn on the wrist.

Figure 5A:
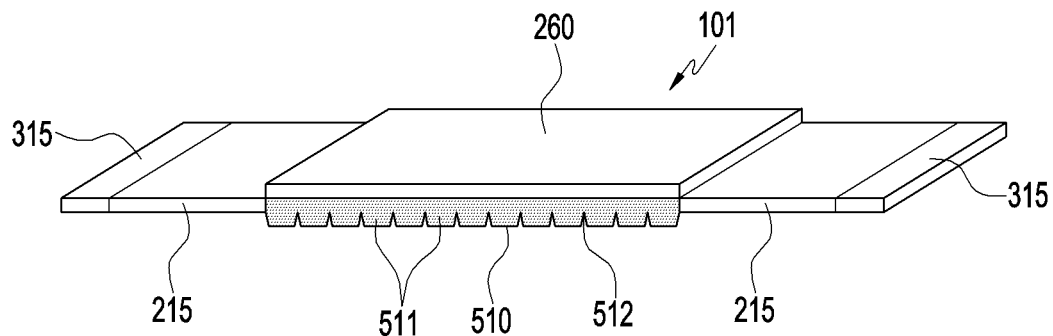
FIG. 5A illustrates a structure of an electronic device according to an embodiment.
Figure 5B:
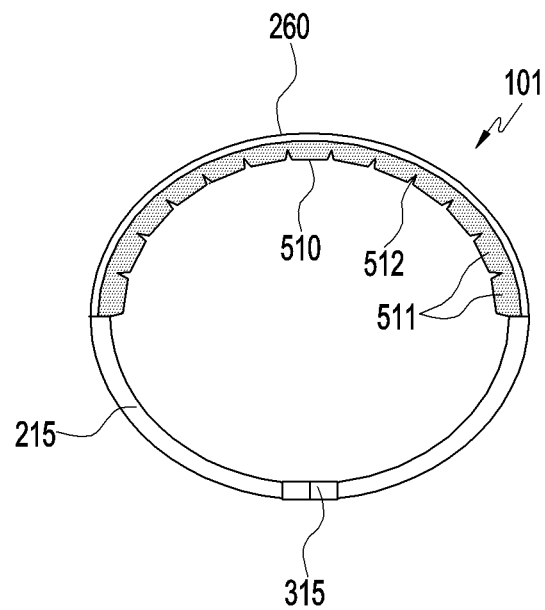
FIG. 5B illustrates a structure of an electronic device according to an embodiment.

FIG. 5A is an illustration of a structure of the electronic device 101 according to an embodiment. FIG. 5B is an illustration of a structure of the electronic device 101 according to an embodiment.

Referring to FIGS. 5A and 5B, the electronic device 101 is shown to be roughly flat in FIG. 5A, and shows the electronic device 101 worn on the wrist by applying a force thereto in FIG. 5B. For example, the electronic device 101 may operate in a flat state, as shown in FIG. 5A, or may operate in a rolled state, as shown in FIG. 5B.

The electronic device 101 may include a body 510, a strap 215 disposed on both ends of the body 510 to surround and be fastened to the wrist of the user, a fastening member 315 for fastening opposite ends of the straps 215 where the ends meet each other, and a flexible display 260 disposed on one surface of the body 510.

The body 510 may include a plurality of segmented nodes 511 and hinges 512 connecting the nodes 511 at the bottom of the flexible display 260. Each segmented node 511 of the body 510 may be configured with a hardware module. For example, the body 510 may be a flexible electronic device in which a plurality of segmented nodes 511 is bent according to a user's body curvature. A part of the body 510 may have a fixed degree of bending, the hardware module may be configured at a portion in which additional nodes are configured in a segmented form and having a fixed degree of bending, and the body 510 may provide flexibility characteristics due to a portion in which segmented nodes are configured.

Figure 6:
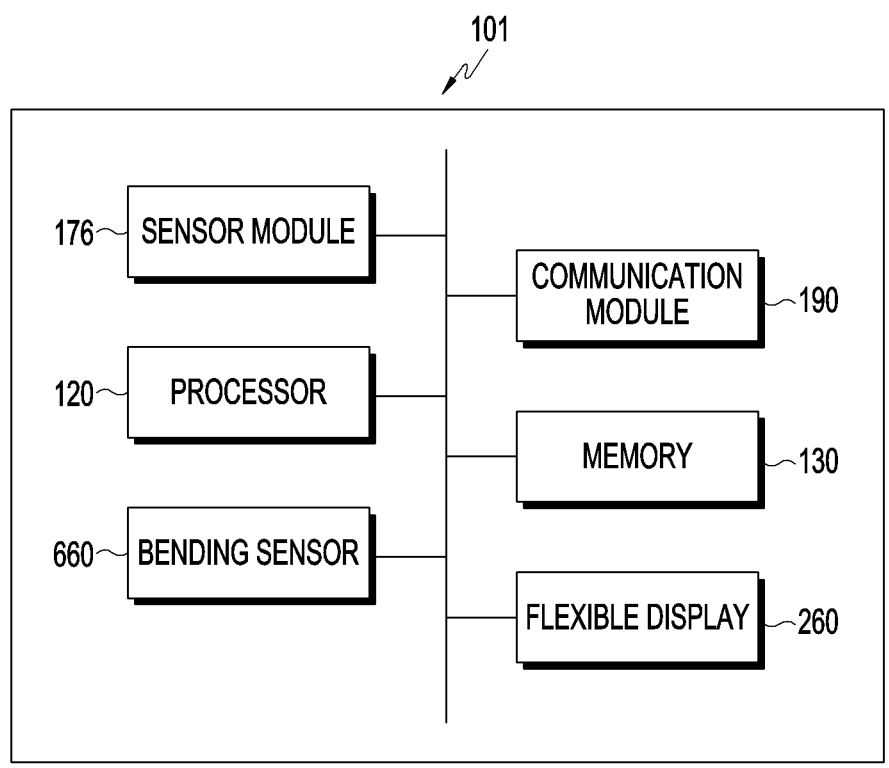
FIG. 6 is a block diagram of an electronic device according to an embodiment.

FIG. 6 is a block diagram of the electronic device 101 according to an embodiment.

Referring to FIG. 6, the electronic device 101 may include the processor 120, the memory 130, the communication module 190, the sensor module 176, a flexible display 260, a bending sensor 660, and/or structures for receiving the above elements.

The electronic device 101 may be a wearable electronic device that may be worn on a user's body. For example, the electronic device 101 may include hardware elements, such as the processor 120, the memory 130, the communication module 190, the sensor module 176, and the bending sensor 660; and the flexible display 260, wherein the hardware elements may be received within the bodies 210, 410, and 510, which can be flexibly deformed into a form that can be worn on a user's body; and the flexible display 260 configured to be disposed on a surface exposed to the outside when the bodies 210, 410, and 510 are attached to the body. When implemented in a practical application, as necessary, two or more device elements of the electronic device 101 may be combined into one element, or one element may be subdivided into two or more elements, some elements thereof may be excluded, or other elements may be further configured therein.

The processor 120 may display first object information on a first display area of the flexible display 260, based at least on the wearing state information of the electronic device 101 and/or the bending state information of the electronic device 101.

The processor 120 may identify wearing state information including at least one of whether the electronic device 101 is being worn, a wearing position on which the electronic device 101 is being worn, or a wearing orientation in which the electronic device 101 is being worn, using at least one sensor included in the sensor module 176. The processor 120 may identify whether or not the electronic device 101 is being worn according to whether the electronic device 101 comes into contact with a user's body using a proximity sensor included in the sensor module 176. Alternatively, the processor 120 may identify whether or not the electronic device 101 is in a wearing state according to whether a user's body signal is detected using the biometric sensor included in the sensor module 176 after the electronic device 101 comes into contact with the user's body. Alternatively, the processor 120 may receive a signal indicating a fastening state from the fastening member 315, which is responsible for fastening of the electronic device 101, and may identify whether or not the electronic device 101 is in a wearing state according to whether or not the signal is received. The processor 120 may identify the part of the body on which the electronic device 101 is being worn or the orientation in which the electronic device 101 is worn, using a gyro sensor, a magnetic sensor, and an acceleration sensor included in the sensor module 176.

The processor 120 may identify bending state information including area segmentation information of the flexible display 260 corresponding to a bending degree of the flexible display 260, using the bending sensor 660. For example, the bending sensor 660 may be configured such that flexible sensors capable of measuring the bending degree of the flexible display 260 are usable in combination with the flexible display 260. For example, the bending sensor 660 may include at least one of a flex sensor, a pressure sensor, at least one inertial sensor (e.g., a gyro sensor and/or an acceleration sensor), or a Hall effect integrated circuit (IC) sensor.

The processor 120 may determine a first display area of the flexible display 260 based on the wearing state information and/or the bending state information. For example, the processor 120 may identify segmented areas of the flexible display 260 based on the bending state information. In addition, based on the wearing state information, when the electronic device 101 is being worn, the processor 120 may identify the position of the user's body on which the electronic device 101 is being worn and the orientation in which the electronic device 101 being worn on the user's body is worn. For example, when it is identified that the electronic device 101 is being worn on the user's left arm, the processor 120 may determine, as a first display area, areas corresponding to a position where a user's gaze is directed to the left from among the segmented areas of the flexible display 260. Alternatively, when it is identified that the electronic device 101 is being worn on the user's right arm, the processor 120 may determine, as a first display area, areas corresponding to a position where a user's gaze is directed to the right from among the segmented areas of the flexible display 260.

The processor 120 may display first object information on the first display area of the flexible display 260. For example, the first object information may include a watch face screen, a user interface screen, and a display screen showing various contents. The first object information may include a screen configured to have a size or orientation suitable for serving as the first display area. For example, when the first display area includes a wide area in the entire area of the flexible display 260, the processor 120 may display first object information including a screen corresponding to the wide area. Alternatively, when the first display area includes a narrow area in the entire area of the flexible display 260, the processor 120 may display first object information including a screen corresponding to the narrow area. Alternatively, when the electronic device 101 is worn on the left arm of the user, the processor 120 may display first object information including a screen that is useful when a user looks in the left direction. Alternatively, when the electronic device 101 is worn on the right arm of the user, the processor 120 may display first object information including a screen that is useful when the user looks in the right direction.

The processor 120 may, in response to identification of a situation change of the electronic device 101, display second object information on a second display area including at least a partial area of the first display area of the flexible display 260, based at least on situation information of the electronic device 101 and/or posture information of the electronic device 101.

The processor 120 may identify situation information of the electronic device 101 based on a pattern of collected sensor data or learning thereof, using at least one sensor included in the sensor module 176. The processor 120 may identify situation information related to a behavior pattern of a user wearing the electronic device 101, based on a pattern or learning of sensor data collected by at least one of a gyro sensor, a magnetic sensor, or an acceleration sensor included in the sensor module 176. For example, the situation information may include at least one of stopping, walking, running, riding a bicycle, driving a vehicle, or exercise using the arms as a user's behavior pattern. The processor 120 may identify whether a previous situation changes to a preconfigured situation based on the situation information of the electronic device 101. For example, the processor 120 may identify that the situation of the electronic device 101 has changed when the previous situation information and newly identified situation information are different from each other. Further, when it is identified that the situation, which has been changed based on the situation information of the electronic device 101, is maintained for a preconfigured time, the processor 120 may identify that the situation of the electronic device 101 has changed. For example, when the identified previous situation information indicates a stopped state and the newly identified situation information indicates a vehicle-driving state, it may be identified that the situation of the electronic device 101 has changed. For example, a situation in which the arm of a user wearing the electronic device 101 is maintained in a fixed state at a predetermined angle and the user's gaze is changed compared to the previous situation may be designated as the preconfigured situation.

The processor 120 may identify, in response to identification of a situation change of the electronic device 101, posture information of the electronic device 101 by using at least one sensor included in the sensor module 176. The processor 120 may identify posture information including a vertical vector of the flexible display 260, based on sensor data collected by an acceleration sensor and a gyro sensor included in the sensor module 176. For example, when the situation is changed to a situation in which the user's arm is maintained in a fixed state at a predetermined angle, such as when driving a vehicle or riding a bicycle, the processor 120 may identify the direction in which the flexible display 260 of the electronic device 101 is oriented according to the user's driving of a vehicle, based on posture information including a vertical vector of the flexible display 260.

The processor 120 may identify a certain area in which the user's gaze is fixed and maintained on the first display area of the flexible display 260, based on situation information of the electronic device 101 and/or posture information of the electronic device 101. For example, when the situation is changed to a situation in which a user's arm is maintained in a fixed state at a predetermined angle in a first direction, such as when driving a vehicle, the processor 120 may identify a certain area of the flexible display 260, to which the user's gaze may be directed according to the first direction of the user's arm, based on posture information including a vertical vector of the flexible display 260. Further, when the identified certain area is limited to a partial area of the first display area of the flexible display 260, the processor 120 may determine the corresponding partial area as a second display area. Alternatively, when the situation is changed to a situation in which the user's arm is maintained in a fixed state at a predetermined angle in a second direction, such as when riding a bicycle, the processor 120 may identify a certain area of the flexible display 260, to which the user's gaze may be directed according to the second direction of the user's arm, based on posture information including a vertical vector of the flexible display 260. Further, when the identified certain area is limited to a partial area of the first display area of the flexible display 260, the processor 120 may determine the corresponding partial area to be a second display area.

The processor 120 may display second object information in the second display area of the flexible display 260. For example, the second object information may include a watch face screen, a user interface screen, and a display screen showing various contents, which are the same as those of the first object information displayed on the first display area. The second object information may include a screen obtained by modifying a screen of the first object information to be suitable for a size or position corresponding to a second display area different from the first display area. For example, when the second display area includes a partial flat area in the first display area, the processor 120 may display second object information including a screen corresponding to an area that is relatively narrower and flatter than the first display area. Alternatively, when the second display area includes a partial curved area in the first display area, the processor 120 may display second object information including a screen corresponding to an area that is relatively narrower and more curved than the first display area.

The processor 120 may activate the first display area or the second display area among the entire area of the flexible display 260, and may deactivate a third display area different from the first display area and the second display area among the entire area. For example, deactivation may refer to: turning off power to a screen area other than the first display area or the second display area among the entire area of the flexible display 260; not displaying the screen; or changing the brightness or color of the screen.

The processor 120 may identify area information of the first display area or the second display area of the flexible display using the bending sensor 660, and may change and display the first object information or the second object information based on the identified area information. For example, the thicknesses of wrists of various users wearing the electronic device 101 may be different from each other, and the degree of bending of the flexible display 260 may also be different from each other according to the thicknesses of the wrists of the users. For example, the flexible displays 260 may have the same total area. However, the bending degrees or bending positions of the flexible displays 260 may be different depending on the users wearing the flexible displays, and thus area segmentation of the flexible displays 260 may be differently configured. The processor 120 may configure a screen size or arrangement of the first object information or the second object information differently from the default screen configuration so as to be suitable for the area information of the first display area or the second display area of the flexible display 260, and display the same.

The processor 120 may identify movement information of the electronic device 101 using at least one sensor included in the sensor module 176, and may change and display the first object information or the second object information based on the identified movement information. For example, the processor 120 may identify movement information of the electronic device 101 based on sensor data collected by at least one of a gyro sensor, a magnetic sensor, or an acceleration sensor included in the sensor module 176, and when the identified movement information is repeated with a predetermined pattern, the processor 120 may change and display a display direction, a screen size, or an arrangement of the first object information or the second object information with respect to the default screen configuration so as to have visibility suitable for the corresponding movement.

The memory 130 may store a program and various data for controlling the overall operation of the electronic device 101. For example, the memory 130 may store instructions which, when executed, control the processor 120 to perform various operations.

The communication module 190 may have a hardware and software configuration that enables video communication, voice communication, and data communication.

The sensor module 176 may include sensors required for the processor 120 to acquire wearing state information, bending state information, situation information, or posture information of the electronic device 101. For example, the sensor module 176 may include at least one of a gyro sensor, a magnetic sensor, an acceleration sensor, a proximity sensor, or a biometric sensor. The sensor module 176 may include at least one inertial sensor (e.g., a gyro sensor and/or an acceleration sensor), and the at least one inertial sensor may perform the corresponding function in place of all or part of the bending sensor 660.

The flexible display 260 may be a hardware configuration that displays information processed in the electronic device 101. The flexible display 260 may provide an information screen to a user. The flexible display 260 may be configured as a touch screen including a touch panel.

The bending sensor 660 may measure a bending degree of the electronic device 101 or the flexible display 260. For example, the bending degree may refer to a state in which the external shape of the electronic device 101 or the flexible display 260 is changed, such as bending, folding, or rolling. The bending sensor 660 may be configured such that flexible sensors capable of measuring the bending degree of the electronic device 101 are combined with the flexible display 260 and used. For example, the bending sensor 660 may include at least one of a flex sensor, a pressure sensor, at least one inertial sensor (e.g., a gyro sensor and/or an acceleration sensor), or a Hall effect IC sensor. For example, the bending sensor 660 may include a flex sensor, and the flex sensor may detect whether the flexible display 260 is deformed according to whether a measured resistance value is changed. In addition, the flex sensor may include a plurality of sensing points arranged at a predetermined interval, and may detect a deformation curvature or a deformation position according to a numerical change collected at each sensing point. Alternatively, according to the structure of the electronic device 101, for example, in a case where the electronic device 101 includes the body 510 having a structure as shown in FIGS. 5A and 5B, the bending sensor 660 may include a Hall effect IC sensor installed at each node of the body 510, the Hall effect IC sensor may measure the proximity degree between nodes, and may detect a deformation curvature or a deformation position according to the proximity degree or position. The bending sensor 660 may include a plurality of inertial sensors (e.g., a gyro sensor and/or an acceleration sensor), and the plurality of inertial sensors are disposed at a predetermined interval inside the flexible display 260, and may detect a deformation curvature or a deformation position of the flexible display 260 on the basis of a relative posture difference of each inertial sensor.

Figure 7:
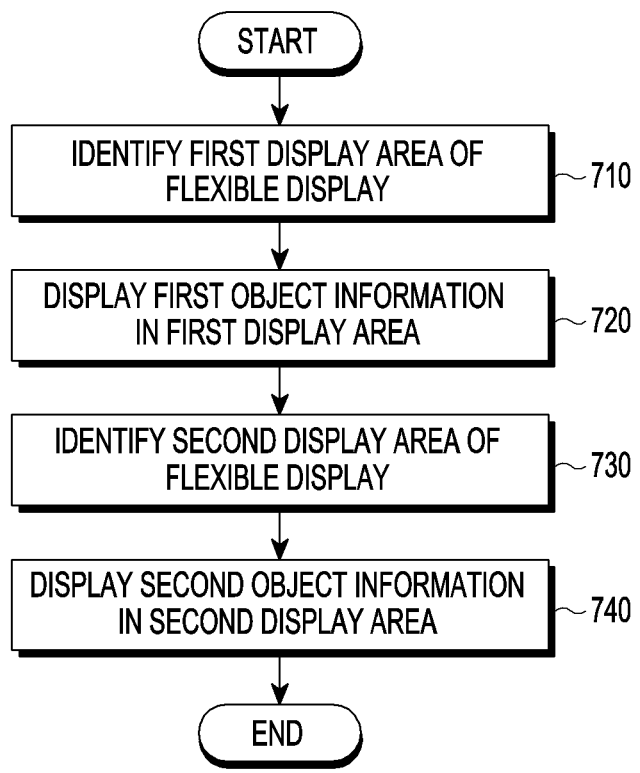
FIG. 7 is a flowchart of a method of controlling a flexible display by an electronic device according to an embodiment.

FIG. 7 is a flowchart of a method of controlling a flexible display by an electronic device according to an embodiment.

Referring to FIG. 7, steps 710, 720, 730, and 740 may be implemented through the electronic device 101, the electronic device 102, or the electronic device 104, or the processor 120. The electronic device 101 may store instructions for executing steps 710, 720, 730, and 740 in the memory 130. At least one of steps 710, 720, 730, and 740 may be omitted, the order of some steps may be changed, or another step may be added.

In step 710, the electronic device 101 may determine a first display area of the display device 160 or the flexible display 260. For example, the electronic device 101 may determine a first display area of the flexible display 260, based at least on wearing state information of the electronic device 101 and/or bending state information of the electronic device 101.

The electronic device 101 may identify whether the electronic device 101 is being worn on a user's body using a biometric sensor or a proximity sensor included in the sensor module 176, or the fastening member 315, responsible for fastening the electronic device 101.

When it is identified that the electronic device 101 is being worn on a user's body, the electronic device 101 may identify the part of the body on which the electronic device 101 is being worn or the orientation thereof using at least one of a gyro sensor, a magnetic sensor, or an acceleration sensor included in the sensor module 176.

The electronic device 101 may identify bending state information, including area segmentation information of the flexible display 260 corresponding to the bending degree of the flexible display 260, using the bending sensor 660.

The electronic device 101 may determine a first display area of the flexible display 260 based on the identified wearing state information of the electronic device 101 and/or bending state information of the electronic device 101. For example, the electronic device 101 identifies segmented areas of the flexible display 260 based on the bending state information, and if it is determined that the electronic device 101 is being worn based on the wearing state information, the electronic device 101 may identify the part of the body of the user on which the electronic device 101 is being worn, and may identify the orientation in which the worn electronic device 101 is being worn. For example, when it is identified that the electronic device 101 is worn on the left arm of the user, based on the identified wearing state information and bending state information of the electronic device 101, the electronic device 101 may determine, as a first display area, areas corresponding to a position where the user's gaze is directed to the left from among the segmented areas of the flexible display 260. Alternatively, when it is identified that the electronic device 101 is worn on the right arm of the user, the electronic device 101 may determine, as a first display area, areas corresponding to a position where the user's gaze is directed to the right from among the segmented areas of the flexible display 260.

In step 720, the electronic device 101 may display first object information on the first display area of the flexible display 260. For example, the first object information may include a watch face screen, a user interface screen, and a display screen showing various contents. The first object information may include a screen configured to be suitable for a size or a direction corresponding to the first display area. For example, when the first display area includes a wide area in the entire area of the flexible display 260, the electronic device 101 may display first object information including a screen corresponding to a wide area. Alternatively, when the first display area includes a narrow area in the entire area of the flexible display 260, the electronic device 101 may display first object information including a screen corresponding to the narrow area. Alternatively, when the electronic device 101 is mounted on the left arm of the user, the electronic device 101 may display first object information including a screen that is usable when a user looks in the left direction. Alternatively, when the electronic device 101 is mounted on the right arm of the user, the electronic device 101 may display first object information including a screen that is usable when the user looks in the right direction.

In step 730, the electronic device 101 may determine (or identify) a second display area of the flexible display 260. For example, the electronic device 101 may perform an operation for determining the second display area in response to identification of a situation change of the electronic device 101.

The electronic device 101 may identify situation information related to a behavior pattern of a user wearing the electronic device 101, based on a pattern or learning of sensor data collected by at least one of a gyro sensor, a magnetic sensor, or an acceleration sensor included in the sensor module 176. For example, the situation information may include, as the user's behavior pattern, at least one of stopping, walking, running, riding a bicycle, driving a vehicle, or exercising using the arms. For example, the electronic device 101 may perform an operation of determining a second display area when it is identified that a previous situation changes to a preconfigured situation based on the situation information of the electronic device 101, or when it is identified that the changed situation has been maintained for a preconfigured time.

In a case where the situation change of the electronic device 101 satisfies a preconfigured situation change or the situation change is maintained for a predetermined time, the electronic device 101 may identify posture information including a vertical vector of the flexible display 260, based on sensor data collected by at least one of a gyro sensor, a magnetic sensor, or an acceleration sensor included in the sensor module 176. For example, in the case where the situation is changed to a situation in which the user's arm is maintained in a fixed state at a predetermined angle, such as when driving a vehicle or riding a bicycle, the electronic device 101 may identify the direction in which the flexible display 260 of the electronic device 101 is oriented according to the driving a vehicle of the user, based on posture information including a vertical vector of the flexible display 260.

The electronic device 101 may determine a second display area of the flexible display 260 based on the identified situation information of the electronic device 101 and/or posture information of the electronic device 101. For example, the electronic device 101 may identify a certain area, in which the user's eyes are fixed and maintained in the first display area of the flexible display 260. For example, when the situation is changed to a situation in which a user's arm is maintained in a fixed state at a predetermined angle in a first direction, such as when driving a vehicle, the electronic device 101 may identify a certain area of the flexible display 260, to which the user's gaze is directed according to the first direction of the user's arm, based on posture information including a vertical vector of the flexible display 260. Further, when the identified certain area is limited to a partial area of the first display area of the flexible display 260, the electronic device 101 may determine the corresponding partial area to be a second display area. Alternatively, in a case where the identified situation is a situation that has changed to the situation in which the user's arm is maintained in a fixed state at a predetermined angle in a second direction, such as when riding a bicycle, the electronic device 101 may identify a certain area of the flexible display 260, to which the user's gaze may be directed to according to the second direction of the user's arm, based on posture information including a vertical vector of the flexible display 260. Further, when the identified certain area is limited to a partial area of the first display area of the flexible display 260, the electronic device 101 may determine the partial area to be a second display area.

In step 740, the electronic device 101 may display second object information in the second display area of the flexible display 260. For example, the second object information may include a watch face screen, a user interface screen, and a display screen showing various contents, which are the same as those of the first object information displayed on the first display area. The second object information may include a screen obtained by modifying a screen of the first object information to be suitable for a size or position corresponding to a second display area, different from the first display area. For example, in the case where the second display area includes a partial flat area in the first display area, the electronic device 101 may display second object information including a screen corresponding to an area that is relatively narrower and flatter than the first display area. Alternatively, in the case where the second display area includes a partial curved area in the first display area, the electronic device 101 may display second object information including a screen corresponding to an area that is relatively narrower and more curved than the first display area.

Figure 8:
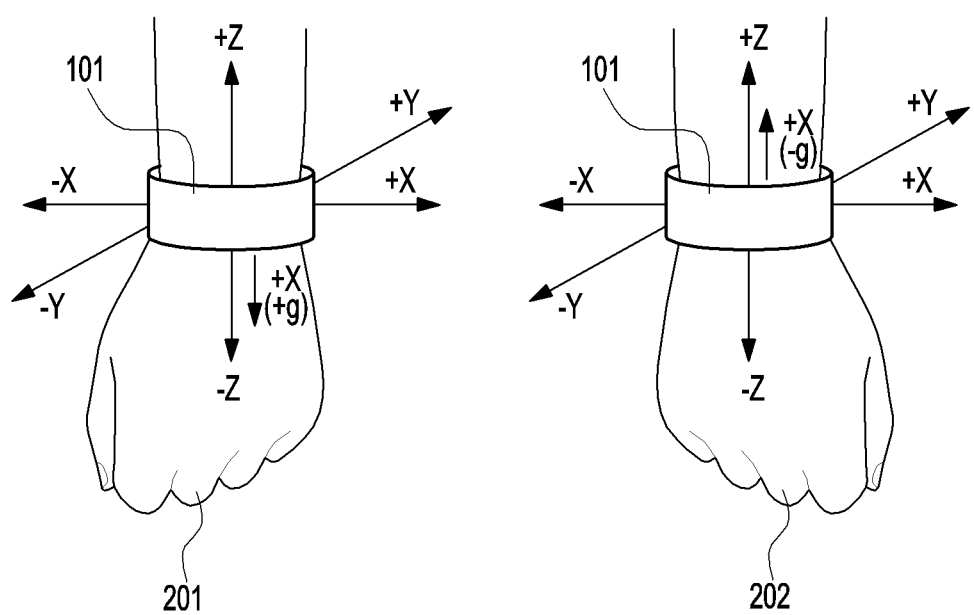
FIG. 8 is an illustration of a method for identifying wearing state information by an electronic device according to an embodiment.

FIG. 8 is an illustration of a method for identifying wearing state information by the electronic device 101 according to an embodiment.

Referring to FIG. 8, the electronic device 101 may be worn on a user's left arm 201 or the user's right arm 202. The electronic device 101 may determine the arm of the user on which the electronic device 101 is mounted, using at least one of a gyro sensor, an acceleration sensor, or a magnetic sensor included in the sensor module 176. For example, when the electronic device 101 is worn on the user's left arm 201, the acceleration value for the x-axis obtained by the acceleration sensor may have a value of "+g", and when the electronic device 101 is worn on the user's right arm 202, the acceleration value of the x-axis obtained by the acceleration sensor may have a value of "−g", and thus the position and the direction in which the electronic device 101 is worn may be distinguished.

Figure 9A:
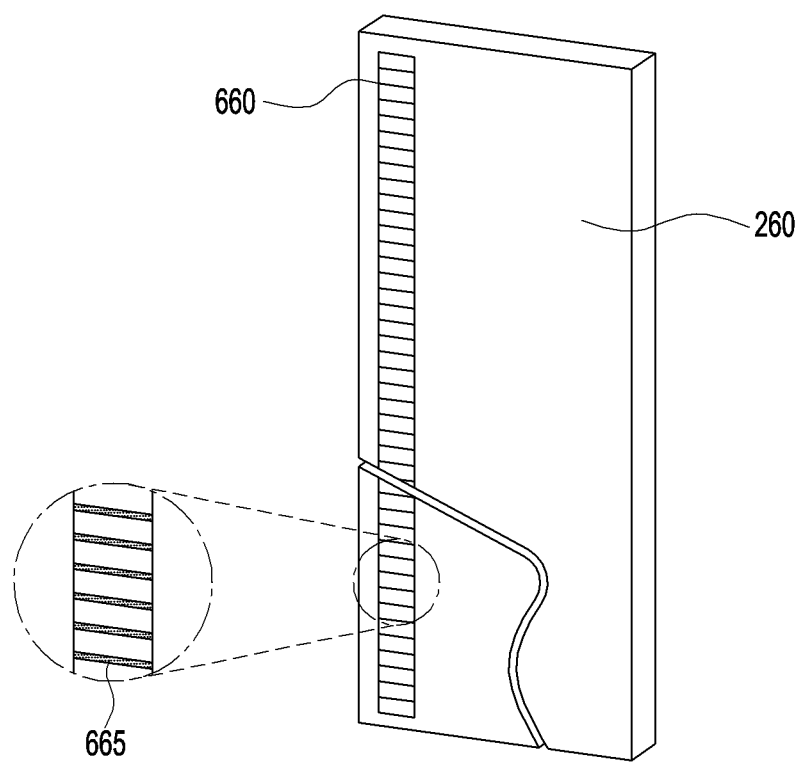
FIG. 9A is an illustration of a bending sensor of an electronic device according to an embodiment.
Figure 9B:
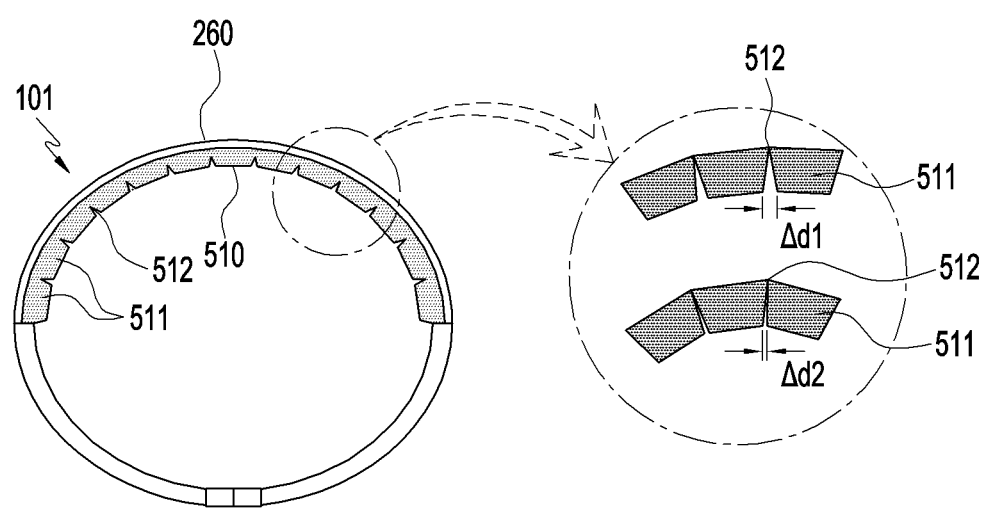
FIG. 9B is an illustration of a bending sensor of an electronic device according to an embodiment.

FIG. 9A is an illustration of the bending sensor 660 of the electronic device 101 according to an embodiment. FIG. 9B is an illustration of the bending sensor 660 of the electronic device 101 according to an embodiment.

Referring to FIGS. 9A and 9B, FIG. 9A illustrates the bending sensor 660 of the electronic device 101 implemented in the flexible display 260, and FIG. 9B illustrates the bending sensor 660 of the electronic device 101 implemented in the body 510.

The flexible display 260 of the electronic device 101 may be implemented in combination with the bending sensor 660. For example, the bending sensor 660 may be a flex sensor capable of measuring resistance values differently according to the degree of bending. The flex sensor may detect whether the flexible display 260 is deformed, according to whether the measured resistance value changes. In addition, the flex sensor may include a plurality of sensing points 665 disposed at a predetermined interval, and may detect a deformation curvature or a deformation position according to a numerical change collected at each sensing point 665.

In a case where the body 510 of the electronic device 101 is implemented as a plurality of segmented nodes 511 and hinges 512 connecting the nodes 511 at the bottom of the flexible display 260, each node 511 may be implemented to include a Hall effect IC sensor. For example, the Hall effect IC sensor included in each of the nodes 511 of the body 510 may measure the proximity degree of nodes 511, and may detect a deformation curvature or a deformation position according to the proximity degree or position. For example, depending on whether a distance measured between nodes 511 of the body 510 is Δd1 or Δd2, the deformation curvature or the deformation position of the electronic device 101 may be detected.

Figure 10:
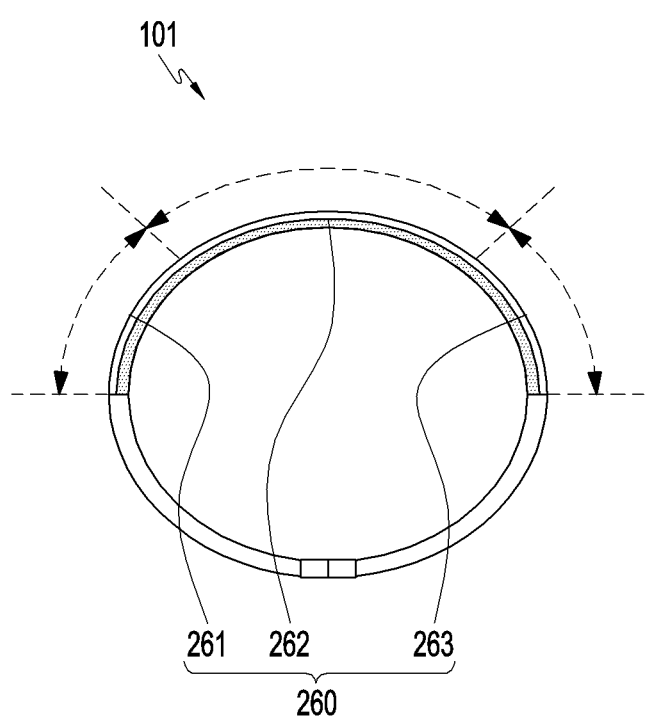
FIG. 10 is an illustration of a method for dividing an area of a flexible display by an electronic device according to an embodiment.

FIG. 10 is an illustration of a method for dividing an area of a flexible display by the electronic device 101 according to an embodiment.

Referring to FIG. 10, the electronic device 101 may be divided into a plurality of areas 261, 262, and 263 corresponding to a bending degree of the flexible display 260, based on sensor data obtained by a bending sensor 660. For example, when the electronic device 101 is worn on the wrist of the user's body, the flexible display 260 may be bent according to an upper portion of the wrist (for example, the manner in which a watch is worn) and a curve along the side of the wrist. The area of the flexible display 260 may be divided by measuring the bending degree using the bending sensor 660. For example, assuming that the electronic device 101 is worn on the user's left arm, an area of the flexible display 260 corresponding to a first position of the left wrist (for example, the left direction from the wrist) is divided into a first area 261, an area of the flexible display 260 corresponding to a second position of the left wrist (e.g., the upper part of the wrist) may be divided into a second area 262, and an area of the flexible display 260 corresponding to a third position of the left wrist (e.g., the right direction from the wrist) may be divided into a third area 263.

Figure 11A:
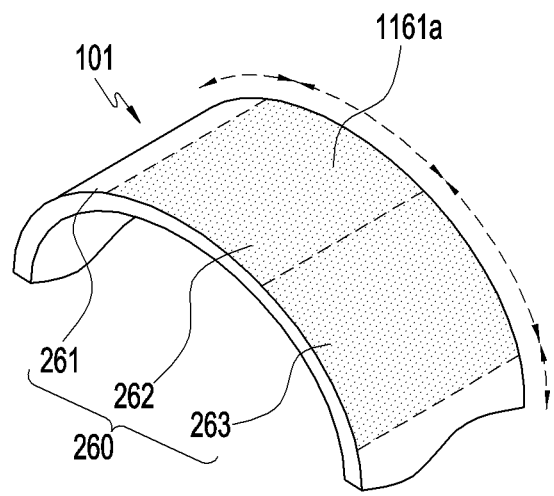
FIG. 11A is an illustration of a method for determining a first display area of a flexible display by an electronic device according to an embodiment.
Figure 11B:
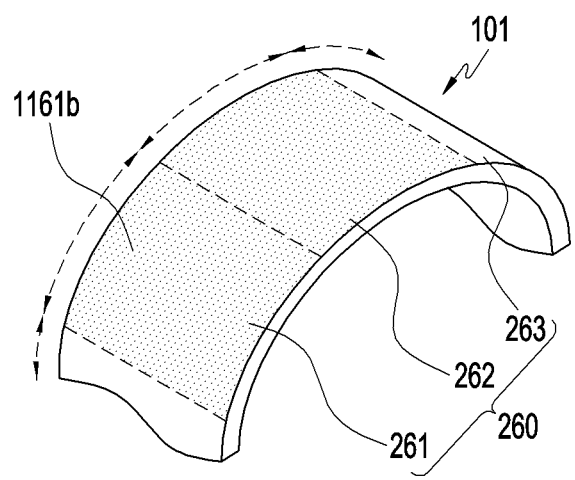
FIG. 11B is an illustration of a method for determining a first display area of a flexible display by an electronic device according to an embodiment.

FIG. 11A is an illustration of a method for determining a first display area of the flexible display 260 by the electronic device 101 according to an embodiment. FIG. 11B is an illustration of a method for determining a first display area of the flexible display 260 by the electronic device 101 according to an embodiment.

Referring to FIGS. 11A and 11B, FIG. 11A illustrates the electronic device 101 worn on the left arm of a user's body, and FIG. 11B illustrates the electronic device 101 worn on the right arm of the user's body.

When the electronic device 101 is worn on the user's left wrist, the user's gaze may be directed to the second area 262 and the third area 263 among the plurality of areas 261, 262, and 263 of the flexible display 260. For example, the electronic device 101 may determine, as a first display area 1161a, the second area 262 and the third area 263 to which the user's gaze may mainly be directed. For example, the electronic device 101 may activate the second area 262 and the third area 263 included in the first display area 1161a so as to display an information screen (e.g., first object information), and may deactivate the first area 261 excluded from the first display area 1161a. For example, power of the deactivated first area 261 may be shut off, a screen may not be displayed, or the brightness or color of the screen may be changed. A screen different from the information screen may be displayed on the deactivated first area 261. For example, the screen different from the information screen may display a preconfigured or fixed image, such as a part of a watch shape or a strap, or an aesthetically pleasing image.

When the electronic device 101 is worn on the user's right wrist, the user's gaze may be directed to the first area 261 and the second area 262 among the plurality of areas 261, 262, and 263 of the flexible display 260. For example, the electronic device 101 may determine the first area 261 and the second area 262, to which the user's gaze may mainly be directed, as the first display area 1161b. For example, the electronic device 101 may activate the first area 261 and the second area 262 included in the first display area 1161b so as to display an information screen (e.g., first object information), and may deactivate the third area 263 excluded from the first display area 1161b.

Figure 12:
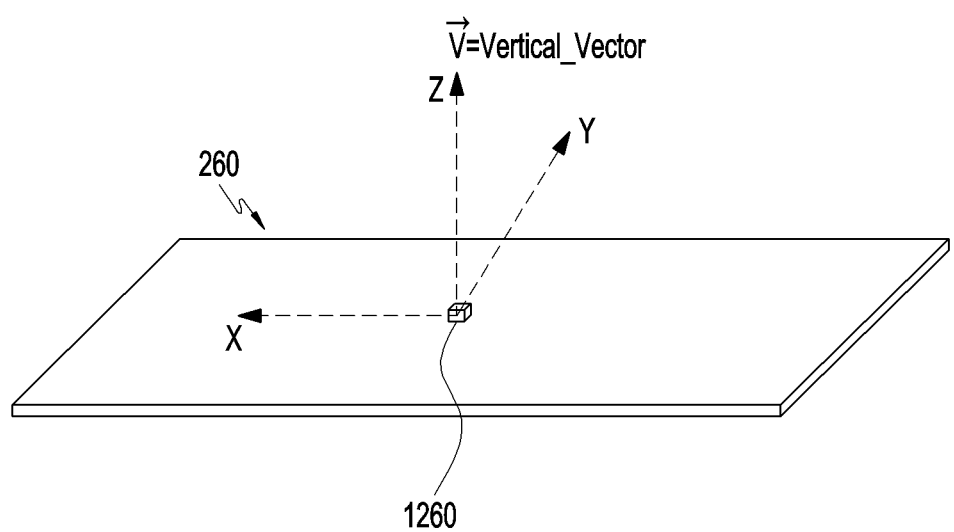
FIG. 12 is an illustration of a method for identifying posture information by an electronic device according to an embodiment.

FIG. 12 is an illustration of a method for identifying posture information by the electronic device 101 according to an embodiment.

Referring to FIG. 12, the electronic device 101 may measure a vertical vector perpendicular to the x-y plane of an electronic device 101, using an acceleration sensor 1260 mounted parallel to the flexible display 260. For example, the vertical vector may have a range from −90 degrees to +90 degrees. For example, when the vertical vector is −90 degrees, the electronic device 101 may identify that the flexible display 260 is in a flat state and is facing the ground. Alternatively, when the vertical vector is 0 degrees, the electronic device 101 may identify that the flexible display 260 is in the vertical state. Alternatively, when the vertical vector is +90 degrees, the electronic device 101 may identify that the flexible display 260 is in the flat state and facing upwards. According to various embodiments, the electronic device 101 may configure a reference gaze posture (e.g., a reference vertical vector), from which the user views the electronic device 101, using the vertical vector Z of the flexible display 260. For example, the electronic device 101 may configure, as a reference gaze posture value, a vertical vector of the flexible display 260 when the user generally looks at the electronic device 101 according to a wearing position or a wearing orientation of the electronic device 101. When the vertical vector of the flexible display 260 is different from the reference gaze posture value, the electronic device 101 may identify that the gaze posture of the user looking at the electronic device 101 has changed. In addition, when it is identified that the gaze posture of the user has changed, the electronic device 101 may change a display area of the flexible display 260 based on the vertical vector of the flexible display 260 at the corresponding time point. For example, the electronic device 101 may provide a configuration interface that enables a user to configure the reference gaze posture of the electronic device 101, induce the user to look the electronic device 101 naturally through the configuration interface, and configure, as the reference gaze posture value, the vertical vector of the flexible display 260 at the corresponding time point. The configuration interface may be provided as part of a configuration menu of the electronic device 101, and the configuration interface may be provided according to the user's menu selection. Alternatively, the configuration interface may be provided during an initial configuration process of the electronic device 101 upon first execution of the electronic device 101. The electronic device 101 may configure a plurality of different gaze posture values for each user situation by using a vertical vector identified for each user situation.

Figure 13A:
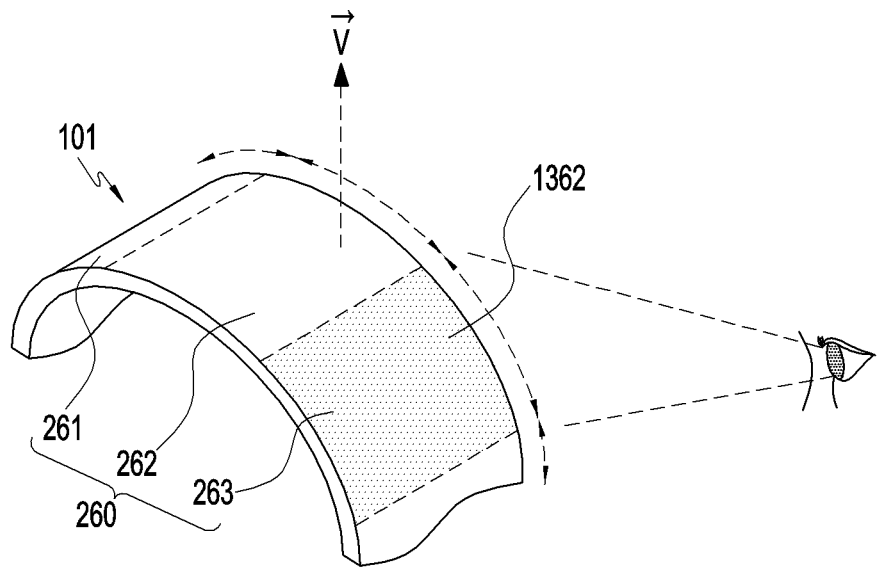
FIG. 13A is an illustration of a method for determining a second display area of a flexible display by an electronic device according to an embodiment.
Figure 13B:
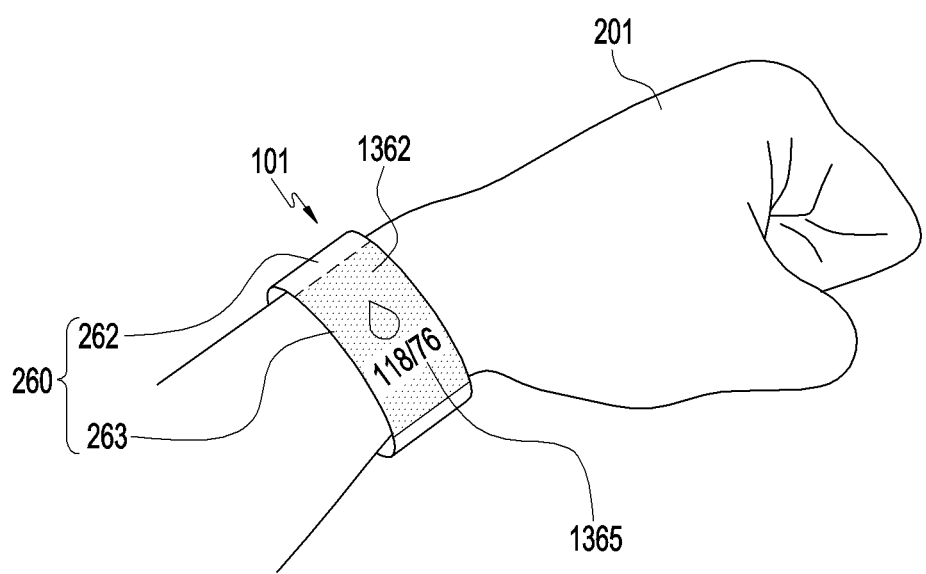
FIG. 13B is an illustration of a method for determining a second display area of a flexible display by an electronic device according to an embodiment.

FIG. 13A is an illustration of a method for determining a second display area of a flexible display by the electronic device 101 according to an embodiment. FIG. 13B is a diagram 1300b for illustrating a method for determining a second display area of a flexible display by an electronic device according to various embodiments.

Referring to FIGS. 13A and 13B, when, for example, the electronic device 101 is worn on the left arm of a user's body, FIG. 13A illustrates an example in which the user's gaze is directed to the third area 263 of the flexible display 260 from the perspective of the user's gaze, and FIG. 13B illustrates an example in which the user's gaze is directed to the third area 263 of the flexible display 260 from the perspective of the user's wearing of the electronic device.

The electronic device 101 may be worn on the wrist of the user's left arm 201, and the user's gaze may be concentrically directed to the inside of the wrist of the user's left arm 201. For example, the electronic device 101 may configure, as a reference gaze posture value, a vertical vector of the flexible display 260 when the user generally looks at the electronic device 101. For example, the vertical vector of the flexible display 260 may have a value of about 45 degrees when the user's gaze is located in the second area 262 and the third area 263 of the flexible display 260 while the user is wearing the electronic device 101 on the wrist of the left arm 201, and the electronic device 101 may configure, as the reference gaze posture value, a value of the vertical direction vector of about 45 degrees. When the situation information of the electronic device 101 is changed to a preconfigured situation and the vertical vector of the flexible display 260 has a value of about 90 degrees, different from the value of about 45 degrees, which is a reference gaze posture value, the electronic device 101 may identify that the user's gaze posture has changed. When the vertical vector of the flexible display 260 has a value of approximately 90 degrees, the electronic device 101 may identify that the user's gaze is concentrically directed to the third area 263 of the flexible display 260, and may determine the third area 263, to which the user's gaze is concentrically directed, to be a second display area 1362. For example, as illustrated in FIG. 11A, the electronic device 101 may determine that the first display area 1161a includes the second area 262 and the third area 263 of the flexible display 260. In addition, when the user's posture is changed and the user's gaze is concentrically directed to the third area 263, the electronic device 101 may determine the third area 263 of the flexible display 260 to be a second display area 1362. For example, when a display area of the flexible display 260 is switched from the first display area 1161a to the second display area 1362, the electronic device 101 may activate only the third area 263 included in the second display area 1362 so as to display an information screen 1365 (for example, second object information), and may deactivate the first area 261 and the second area 262 excluded from the second display area 1362.

Figure 14A:
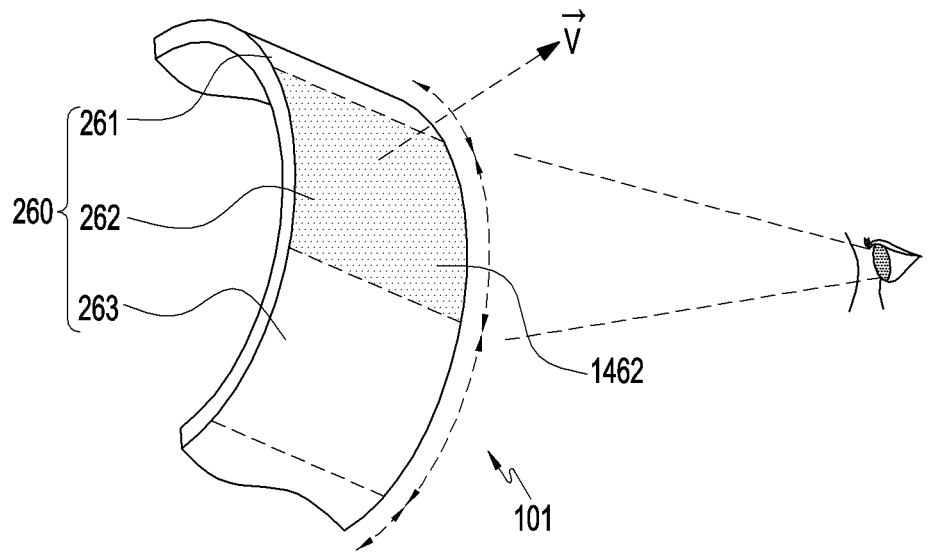
FIG. 14A is an illustration of a method for determining a second display area of a flexible display by an electronic device according to an embodiment.
Figure 14B:
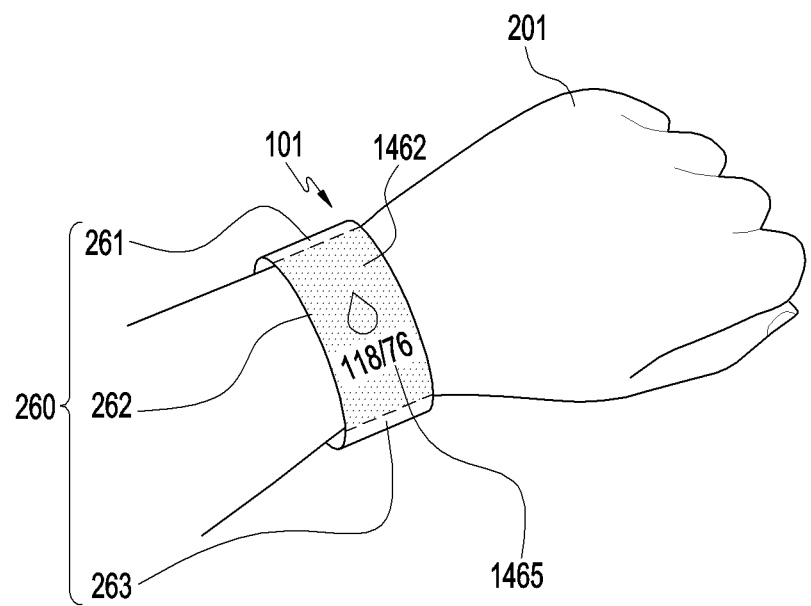
FIG. 14B is an illustration of a method for determining a second display area of a flexible display by an electronic device according to an embodiment.

FIG. 14A is an illustration of a method for determining a second display area of a flexible display by the electronic device 101 according to an embodiment. FIG. 14B is an illustration of a method for determining a second display area of a flexible display by the electronic device 101 according to an embodiment.

Referring to FIGS. 14A and 14B when, for example, the electronic device 101 is worn on the left arm of the user's body, FIG. 14A illustrates an example in which the user's gaze is directed to the second area 262 of the flexible display 260 from the perspective of the user's gaze, and FIG. 14B illustrates an example in which the user's gaze is directed to the second area 262 of the flexible display 260 from the perspective of the user's wearing of the electronic device.

The electronic device 101 may be worn on the wrist of the user's left arm 201, and the user's gaze may be concentrically directed to the upper part of the wrist of the user's left arm 201. For example, the electronic device 101 may configure, as the reference gaze posture value, a value of about 45 degrees, which is a vertical vector when the user's gaze is located in the second area 262 and the third area 263 of the flexible display 260 while the user is wearing the electronic device 101 on the wrist of the left arm 201. The electronic device 101 may identify that the user's gaze posture has changed when the situation information of the electronic device 101 is changed to a preconfigured situation, and the vertical vector of the flexible display 260 closes to a value of about 0 degrees, which is different from the value of about 45 degrees, which is the reference gaze posture value. When the vertical vector of the flexible display 260 has a value of about 0 degrees, the electronic device 101 may identify that the user's gaze is concentrically directed to the second area 262 of the flexible display 260, and may determine the second area 262 to which the user's gaze is concentrically directed, to be a second display area 1462. For example, as illustrated in FIG. 11A, the electronic device 101 may determine that the first display area 1161a includes the second area 262 and the third area 263 of the flexible display 260. In addition, when the user's posture is changed and the user's gaze is concentrically directed to the second area 262, the electronic device 101 may determine the second area 262 of the flexible display 260 to be a second display area 1462. For example, when the display area of the flexible display 260 is switched from the first display area 1161a to the second display area 1462, the electronic device 101 may activate only the second area 262 included in the second display area 1462 so as to display an information screen 1465 (for example, second object information), and may deactivate the first area 261 and the third area 263 excluded from the second display area 1462.

Figure 15:
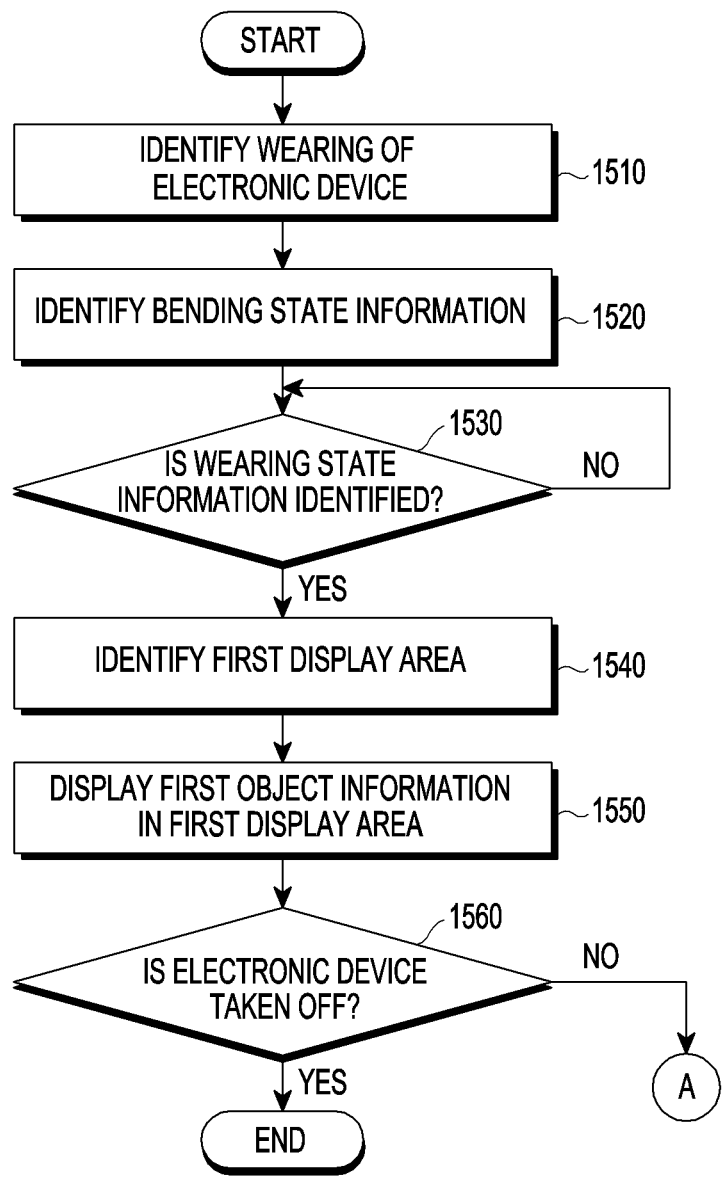
FIG. 15 is a flowchart of a method of controlling a flexible display by an electronic device according to an embodiment.

FIG. 15 is a flowchart of a method of controlling a flexible display by an electronic device according to an embodiment.

Referring to FIG. 15, steps 1510, 1520, 1530, 1540, and 1550 may be implemented through the electronic device 101, the electronic device 102, or the electronic device 104 or the processor 120. The electronic device 101 may store instructions for executing steps 1510 to 1560 in the memory 130. At least one of step 1510 to 1560 may be omitted, the order of some steps may be changed, or another step may be added.

In step 1510, the electronic device 101 may identify whether the electronic device 101 is being worn on a user's body. For example, the electronic device 101 may identify whether the electronic device 101 is being worn on the user's body using a biometric sensor or a proximity sensor included in the sensor module 176, or the fastening member 315 that is responsible for fastening the electronic device 101.

In step 1520, the electronic device 101 may identify bending state information of the electronic device 101. For example, the electronic device 101 may identify bending state information including area segmentation information of the flexible display 260, corresponding to the bending degree of the flexible display 260, using the bending sensor 660.

In step 1530, the electronic device 101 may identify wearing state information of the electronic device 101. For example, the electronic device 101 may determine a position of the body at which the electronic device 101 is being worn or an orientation thereof by using a gyro sensor, a magnetic sensor, and an acceleration sensor included in the sensor module 176. When the wearing state information including the wearing position or the wearing orientation of the electronic device 101 is identified, the electronic device 101 may perform step 1540, and when the wearing state information is not identified, the electronic device 101 is in a standby state until the wearing state information is identified.

In step 1540, the electronic device 101 may determine a first display area of the flexible display 260 based on the identified wearing state information of the electronic device 101 and/or bending state information of the electronic device 101. For example, the electronic device 101 may identify segmented areas of the flexible display 260 based on the bending state information, and if the electronic device 101 is determined to be in a state of being worn by the user based on the wearing state information, the electronic device 101 may identify the position of the user's body on which the electronic device 101 is being worn, and may identify the orientation of the electronic device 101 being worn by the user. For example, when it is identified that the electronic device 101 is worn on the left arm of the user, based on the identified wearing state information and bending state information of the electronic device 101, the electronic device 101 may determine, as a first display area, areas corresponding to the location where the user's gaze is directed to the left among the segmented areas of the flexible display 260. Alternatively, when it is identified that the electronic device 101 is worn on the right arm of the user, the electronic device 101 may determine, as the first display area, areas corresponding to the location where the user's gaze is directed to the right among segmented areas of the flexible display 260.

In step 1550, the electronic device 101 may display first object information on the first display area of the flexible display 260. For example, the first object information may include a watch face screen, a user interface screen, and a display screen showing various contents. The first object information may configure a screen to be suitable for a size or a direction corresponding to the first display area. For example, when the first display area includes a wide area in the entire area of the flexible display 260, the electronic device 101 may display first object information including a screen corresponding to the wide area. Alternatively, when the first display area includes a narrow area in the entire area of the flexible display 260, the electronic device 101 may display first object information including a screen corresponding to the narrow area. Alternatively, when the electronic device 101 is mounted on the left arm of the user, the electronic device 101 may display first object information configured as a screen suitable for a user looking in the left direction. Alternatively, when the electronic device 101 is mounted on the right arm of the user, the electronic device 101 may display first object information configured as a screen suitable for the user looking in the right direction.

In step 1560, the electronic device 101 may identify whether the user has taken off the electronic device 101. When the electronic device 101 is taken off, the electronic device 101 may end display control of the flexible display 260. If the electronic device 101 is not taken off, the electronic device 101 may perform step 1610 in FIG. 16 as a subsequent operation.

Figure 16:
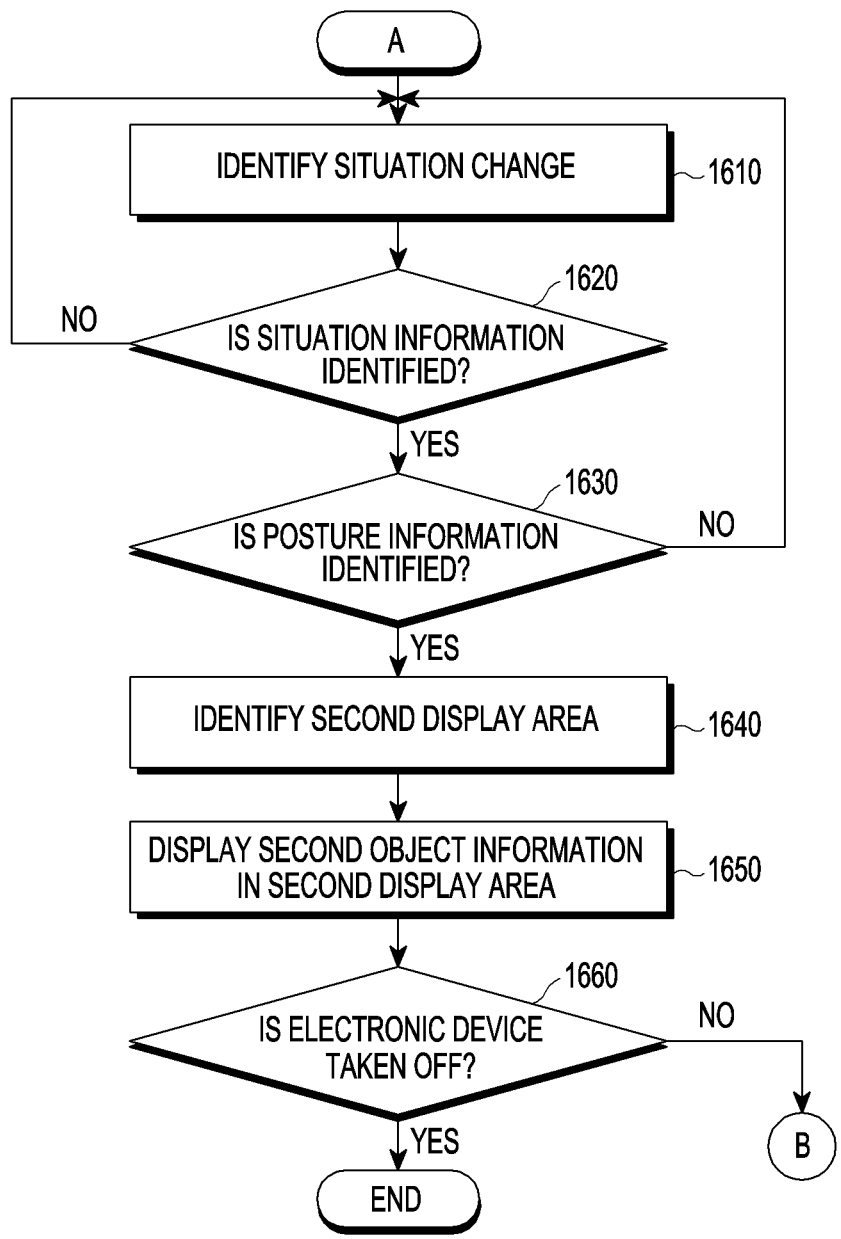
FIG. 16 is a flowchart of a method of controlling a flexible display by an electronic device according to an embodiment.

FIG. 16 is a flowchart of a method of controlling a flexible display by an electronic device according to an embodiment.

Referring to FIG. 16, steps 1610, 1620, 1630, 1640, 1650, and 1660 may be implemented through the electronic device 101, the electronic device 102, or the electronic device 104, or the processor 120. The electronic device 101 may store instructions for executing steps 1610 to 1660 in the memory 130. At least one of steps 1610 to 1660 may be omitted, the order of some steps may be changed, or another step may be added.

Steps 1610 to 1660 may be steps that are subsequently performed when the electronic device 101 is not taken off in step 1560 of FIG. 15.

In step 1610, the electronic device 101 may identify a change in the situation of the electronic device 101. For example, the electronic device 101 may identify situation information related to a behavior pattern of a user wearing the electronic device 101 based on a pattern or learning of sensor data collected by at least one of a gyro sensor, a magnetic sensor, or an acceleration sensor included in the sensor module 176. For example, the situation information may include, as a user's behavior pattern, at least one of stopping, walking, running, riding a bicycle, driving a vehicle, or exercising using the arms.

In step 1620, the electronic device 101 may identify that the situation of the electronic device 101 has changed when it is identified that the previous situation has changed to a preconfigured situation based on the situation information of the electronic device 101, or when it is identified that the changed situation is maintained for a preconfigured period of time. The electronic device 101 performs step 1630 when it is identified that the situation change of the electronic device 101 satisfies a preconfigured situation change or the situation change is maintained for a predetermined period of time. Otherwise, the electronic device 101 may be in a standby state and proceed to step 1610 until the situation change of the electronic device 101 satisfies the preconfigured situation change.

In step 1630, when the situation change of the electronic device 101 satisfies a preconfigured situation change or when the situation change is maintained for a predetermined period of time, the electronic device 101 may identify posture information including a vertical vector of the flexible display 260, based on sensor data collected by an acceleration sensor or a gyro sensor included in the sensor module 176. For example, when the situation of the electronic device 101 is changed to a situation in which the user's arm is maintained in a fixed state at a predetermined angle, such as when driving a vehicle or riding a bicycle, the electronic device 101 may identify the direction in which the flexible display 260 of the electronic device 101 is oriented according to the user driving a vehicle, based on posture information including the vertical vector of the flexible display 260. If the posture information of the electronic device 101 is identified, the electronic device 101 may perform step 1640, and, if the posture information is not identified, the electronic device 101 may proceed to step 1610.

In step 1640, the electronic device 101 may determine a second display area of the flexible display 260 based on the identified situation information of the electronic device 101 and/or posture information of the electronic device 101. For example, the electronic device 101 may identify a certain area in which the user's gaze is fixed and maintained in a first display area of the flexible display 260. For example, when the identified situation is changed to a situation in which the user's arm is maintained in a fixed state at a predetermined angle in the first direction, such as when driving a vehicle, the electronic device 101 may identify a certain area of the flexible display 260 to which the user's gaze can be directed according to the first direction of the user's arm, based on the posture information including the vertical vector of the flexible display 260. Further, when the identified certain area is limited to a partial area in the first display area of the flexible display 260, the electronic device 101 may determine the partial area as a second display area. Alternatively, when the identified situation is changed to a situation in which the user's arm is maintained in a fixed state at a predetermined angle in a second direction, such as when riding a bicycle, the electronic device 101 may identify a certain area of the flexible display 260 to which the user's gaze can be directed according to the second direction of the user's arm, based on the posture information including the vertical vector of the flexible display 260. Further, when the identified certain area is limited to a partial area in the first display area of the flexible display 260, the electronic device 101 may determine the corresponding partial area to be a second display area.

In step 1650, the electronic device 101 may display second object information in the second display area of the flexible display 260. For example, the second object information may include a watch face screen, a user interface screen, and a display screen showing various contents, which are the same as the first object information displayed on the first display area. The second object information may include a screen obtained by modifying a screen of the first object information to be suitable for a size or position corresponding to a second display area different from the first display area. For example, when the second display area includes a partial flat area in the first display area, the electronic device 101 may display second object information configured as a screen corresponding to an area that is relatively narrower and flatter than the first display area. Alternatively, when the second display area includes a partial curved area in the first display area, the electronic device 101 may display second object information configured as a screen corresponding to an area that is relatively narrower and more curved than the first display area.

In step 1660, the electronic device 101 may identify whether the user has taken off the electronic device 101. When the electronic device 101 has been taken off, the electronic device 101 may end display control of the flexible display 260. If the electronic device 101 has not been taken off, the electronic device 101 may perform step 2110 in FIG. 21 as a subsequent operation.

Figure 17:
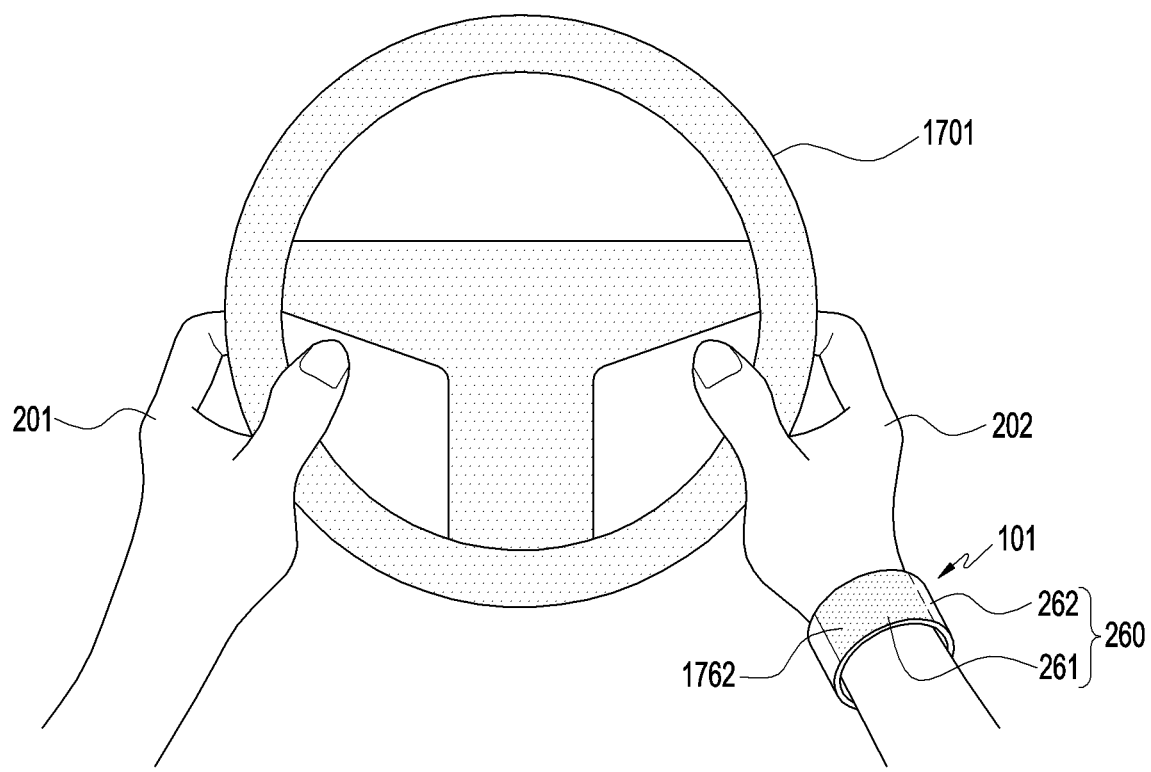
FIG. 17 is an illustration of an electronic device controlling a flexible display according to an embodiment.

FIG. 17 is an illustration in which the electronic device 101 controls a flexible display according to an embodiment.

Referring to FIG. 17, a user may wear the electronic device 101 on the wrist of the user's right arm 202, and the user may be in a state of holding a steering wheel 1701 of a vehicle with both hands of the left arm 201 and the right arm 202 while driving the vehicle.

For example, the electronic device 101 may identify that the electronic device 101 is located on the right side of the user and determine, as a first display area, a first area 261 and a second area 262 of the flexible display 260, in which the user's gaze is mainly located while the electronic device 101 is located on the right side of the user, and may display screen information on the determined first display area.

Thereafter, when the user's behavior pattern is changed to a vehicle-driving state, the electronic device 101 may recognize that the situation of the electronic device 101 is changed to the vehicle-driving state, and may identify posture information of the electronic device 101 including the vertical vector of the flexible display 260 in a driving a vehicle situation. The electronic device 101 may identify that the first area 261 of the flexible display 260 corresponding to the side of the user's wrist is located in the user's gaze, based on posture information of the electronic device 101, and may change a display area of the flexible display 260 from the previous first display area to a second display area 1762 including only the first area 261.

Figure 18:
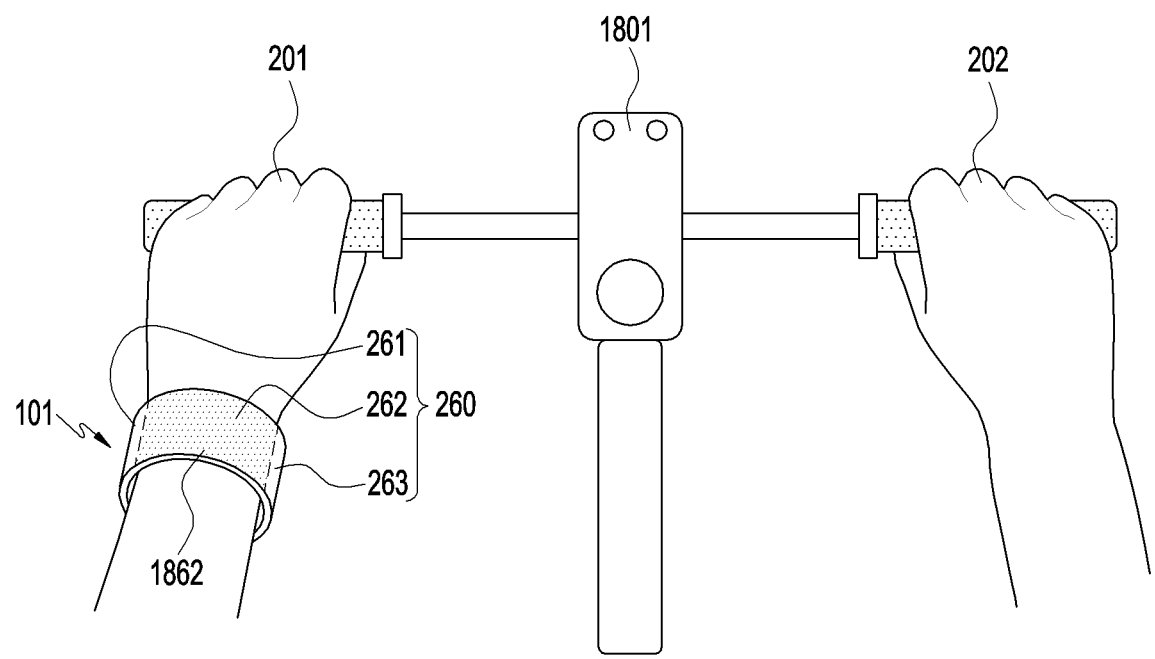
FIG. 18 is an illustration of an electronic device controlling a flexible display according to an embodiment.

FIG. 18 is an illustration in which the electronic device 101 controls a flexible display according to an embodiment.

Referring to FIG. 18, a user may wear the electronic device 101 on the wrist of the user's right arm 202, and the user may be in a state of holding a steering wheel 1801 of a bicycle with both hands of the left arm 201 and the right arm 202 while driving the bicycle. For example, the electronic device 101 may identify that the electronic device 101 is located on the left side of the user and determine, as a first display area, a second area 262 and a third area 263 of the flexible display 260, in which the user's gaze is mainly located while the electronic device 101 is located on the left side of the user, and may display screen information on the determined first display area.

Thereafter, when the user's behavior pattern is changed to a bicycle-riding state, the electronic device 101 may recognize that the situation of the electronic device 101 is changed to the bicycle-riding state, and may identify posture information of the electronic device 101 including the vertical vector of the flexible display 260 in the riding a bicycle situation. The electronic device 101 may identify that the second area 262 of the flexible display 260 corresponding to the upper side of the user's wrist is located in the user's gaze, based on the posture information of the electronic device 101, and may change a display area of the flexible display 260 from the previous first display area to a second display area 1862 including only the second area 262.

Figure 19:
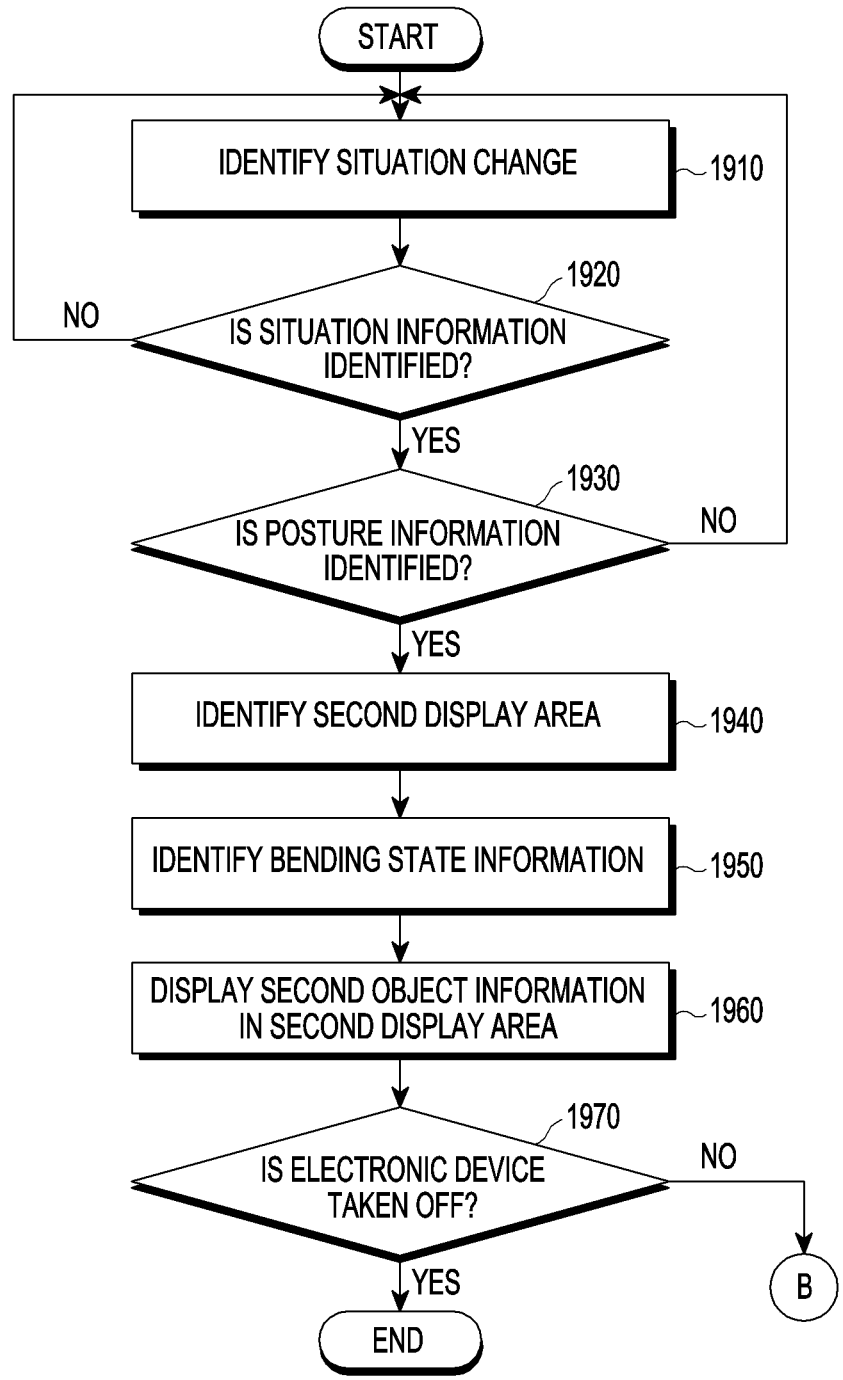
FIG. 19 is a flowchart of a method of controlling a flexible display by an electronic device according to an embodiment.

FIG. 19 is a flowchart of a method of controlling a flexible display by an electronic device according to an embodiment.

Referring to FIG. 19, steps 1910, 1920, 1930, 1940, 1950, 1960, and 1970 may be implemented through the electronic device 101, the electronic device 102, or the electronic device 104, or the processor 120. The electronic device 101 may store instructions for executing steps 1910 to 1970 in the memory 130. At least one of steps 1910 to 1970 may be omitted, the order of some steps may be changed, or another step may be added.

Steps 1910 to 1970 may be steps that are subsequently performed when the electronic device 101 is determined not to have been taken off in step 1560 of FIG. 15.

In step 1910, the electronic device 101 may identify a situation change of the electronic device 101.

In step 1920, the electronic device 101 performs step 1930 when it is identified that the situation change of the electronic device 101 satisfies a preconfigured situation change or the situation change is maintained for a predetermined period of time.

Otherwise, the electronic device 101 may be in a standby state and proceed to step 1910 until the situation change of the electronic device 101 satisfies the preconfigured situation change.

In step 1930, when the situation change of the electronic device 101 satisfies a preconfigured situation change or when the situation change is maintained for a predetermined period of time, the electronic device 101 may identify posture information including a vertical vector of the flexible display 260, based on sensor data collected by an acceleration sensor or a gyro sensor included in the sensor module 176. If the posture information of the electronic device 101 is identified, the electronic device 101 may perform step 1940, and if the posture information is not identified, the electronic device 101 may proceed to step 1910.

In step 1940, the electronic device 101 may determine a second display area of the flexible display 260, based on the identified situation information of the electronic device 101 and/or posture information of the electronic device 101.

In step 1950, the electronic device 101 may identify bending state information of the electronic device 101. For example, the electronic device 101 may identify area information of the second display area of the flexible display by using the bending sensor 660. For example, the thicknesses of wrists of various users wearing the electronic device 101 may be different from each other, and bending degrees of the flexible display 260 may also be different from each other according to the thickness of the wrists of the users. For example, the total areas of the flexible displays 260 may be the same, but bending degrees or bending positions of the flexible displays 260 may be different depending on the user wearing the electronic device, and thus, area segmentation of the flexible display 260 may be configured differently. Therefore, the areas of the second display areas of the flexible displays 260 may be different from each other.

In step 1960, the electronic device 101 may display second object information in the second display area. For example, the electronic device 101 may display second object information based on the identified area information of the second display area. For example, the second object information may be configured and displayed differently from a default screen configuration in which the size or layout of a screen is arranged to be suitable for the area information of the second display area.

In step 1970, the electronic device 101 may identify whether the user has taken off the electronic device 101. If the electronic device 101 has been taken off, the electronic device 101 may end display control of the flexible display 260. If the electronic device 101 has not been taken off, the electronic device 101 may perform step 2110 in FIG. 21 as a subsequent step.

Figure 20A:
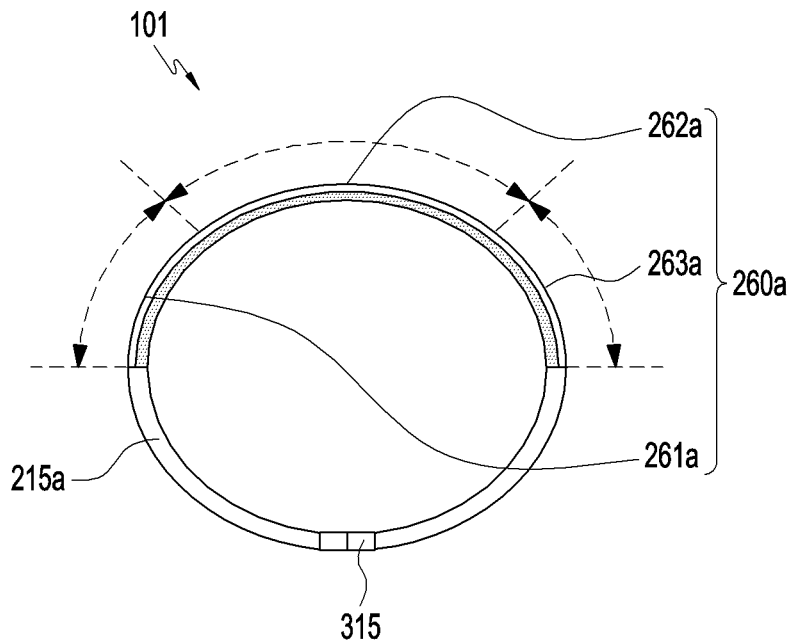
FIG. 20A is an illustration of a method for identifying a segmented area of a flexible display by an electronic device according to an embodiment.
Figure 20B:
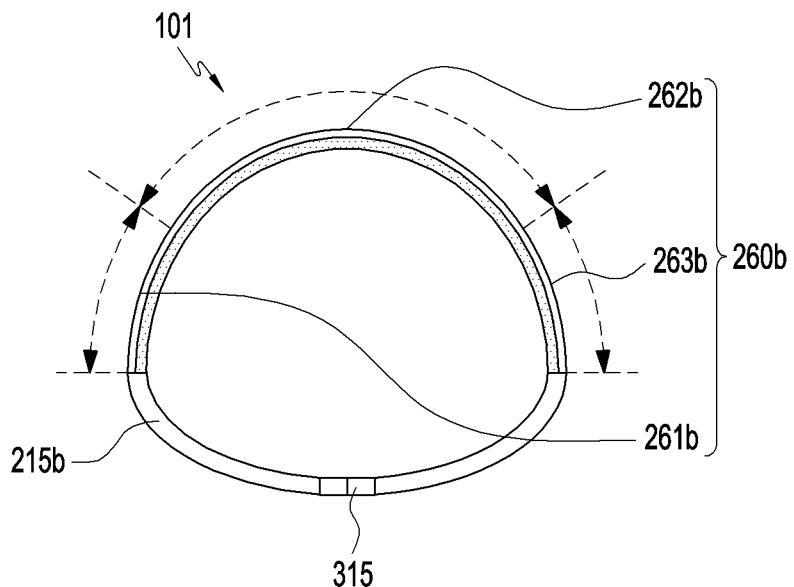
FIG. 20B is an illustration of a method for identifying a segmented area of a flexible display by an electronic device according to an embodiment.

FIG. 20A is an illustration of a method for identifying a segmented area of a flexible display by the electronic device 101 according to an embodiment. FIG. 20B is an illustration of a method for identifying a segmented area of a flexible display by the electronic device 101 according to an embodiment.

Referring to FIGS. 20A and 20B, the wrist thicknesses of users are different from each other, and FIG. 20A illustrates the situation where the wrist of a user is thicker than that of FIG. 20B.

When the electronic device 101 is worn on a user's wrist, the length of the end of the strap 215*a* shown in FIG. 20A and the length of the end of the strap 215*b* shown in FIG. 20B may be adjusted differently depending on the thickness of a user's wrist. The area of segmented areas 261*a*, 262*a*, and 263*a* of the flexible display 260*a* shown in FIG. 20A and the area of the segmented areas 261*b*, 262*b*, and 263*b* of the flexible display 260*b* shown in FIG. 20B may be different from each other, and bending portions thereof may be different from each other.

Figure 21:
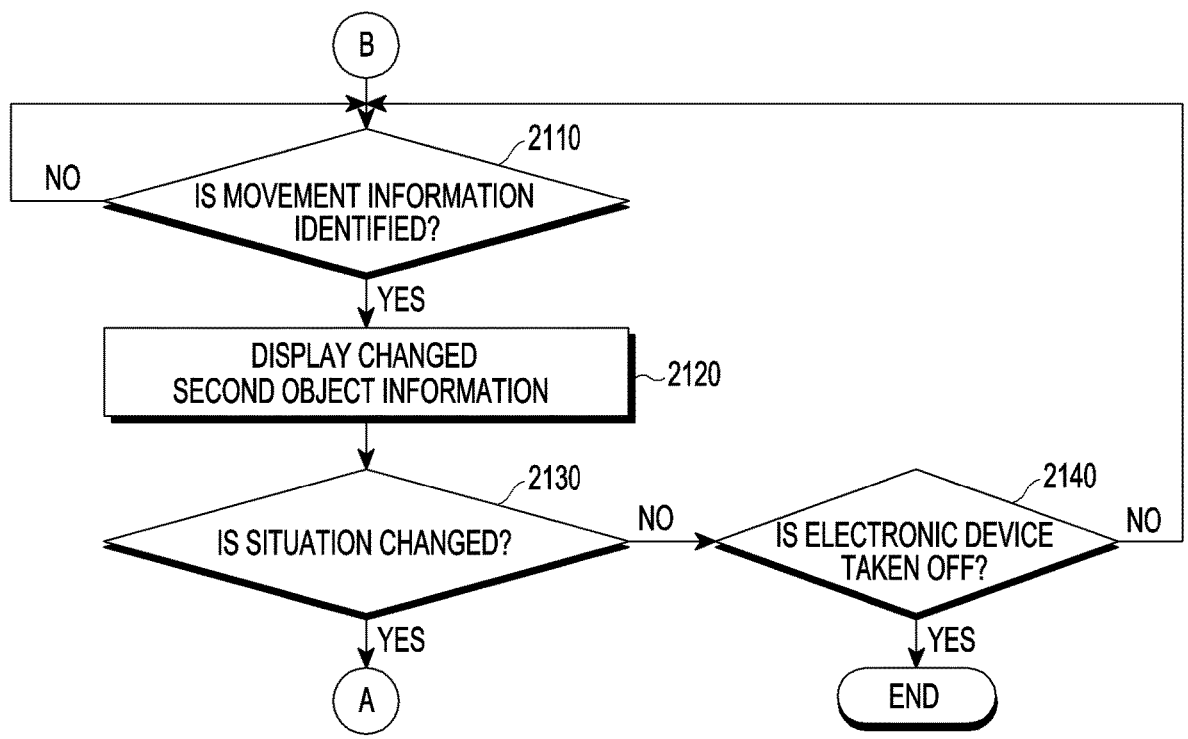
FIG. 21 is a flowchart of a method of controlling a flexible display by an electronic device according to an embodiment.

FIG. 21 is a flowchart of a method of controlling a flexible display by an electronic device according to an embodiment.

Referring to FIG. 21, steps 2110, 2120, 2130, and 2140 may be implemented through the electronic device 101, the electronic device 102, or the electronic device 104, or the processor 120. The electronic device 101 may store instructions for executing steps 2110 to 2140 in the memory 130. At least one of steps 2110 to 2140 may be omitted, the order of some steps may be changed, or another step may be added.

Steps 2110 to 2140 may be steps that are subsequently performed when the electronic device 101 is not taken off in step 1660 of FIG. 16 or step 1970 in FIG. 17.

In step 2110, the electronic device 101 may identify movement information of the electronic device 101. For example, the electronic device 101 may identify whether the identified movement information is repeated with a predetermined pattern. When it is identified that the identified movement information is repeated with a predetermined pattern, the electronic device 101 may perform step 2120.

In step 2120, the electronic device 101 may, in response to the movement information, change and display a display direction, a screen size, or a layout of the second object information with respect to a default screen configuration, so as to have appropriate visibility.

In step 2130, the electronic device 101 may identify whether the situation of the electronic device 101 changes, and if the situation changes, the electronic device 101 may perform step 1610 in FIG. 16 as a subsequent step, and if the situation does not change, the electronic device 101 may proceed to step 2140.

In step 2140, the electronic device 101 may determine whether the user has taken off electronic device 101. If the electronic device 101 is taken off, the electronic device 101 may end display control of the flexible display 260. If the electronic device 101 is not taken off, the electronic device 101 may proceed to step 2110.

Figure 22:
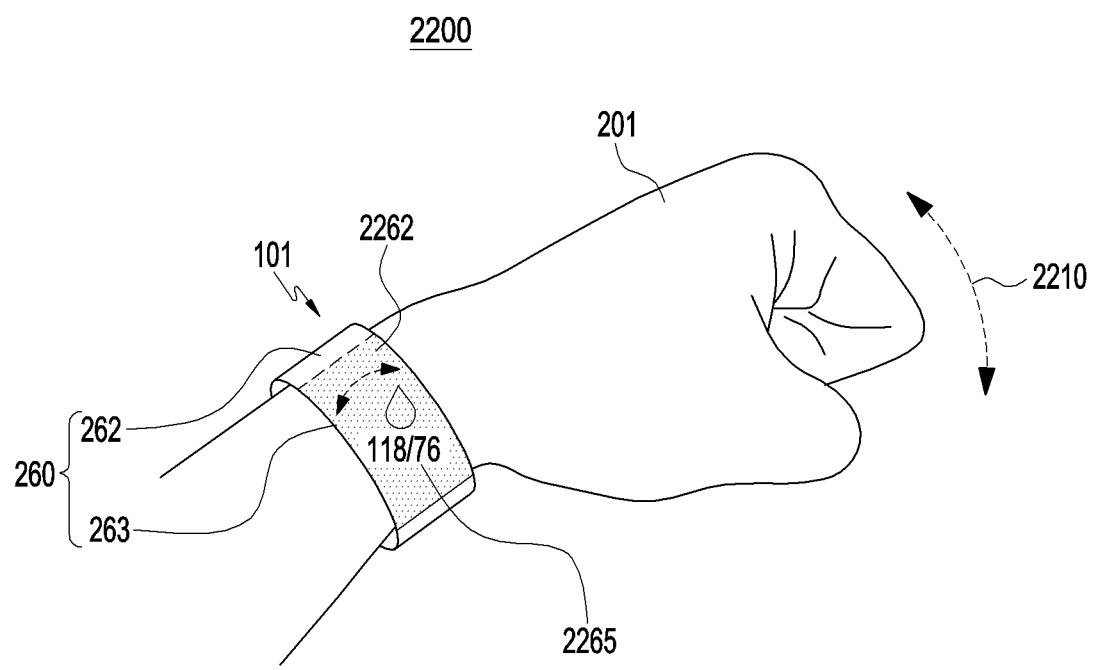
FIG. 22 is an illustration of an electronic device controlling a flexible display according to an embodiment.

FIG. 22 is an illustration of an example in which the electronic device 101 controls a flexible display according to various embodiments.

Referring to FIG. 22, a user may wear the electronic device 101 on the wrist of the user's left arm 201 and the user may move the left arm 201. For example, the electronic device 101 may display screen information 2265 (e.g., second object information) on a third area 263 of the flexible display 260. The electronic device 101 may detect the user's movement 2210 by identifying the movement information of the electronic device 101, and if a condition of changing and displaying screen information 2265 in which the user's movement 2210 is displayed is satisfied, the electronic device 101 may change and display the screen information 2265 displayed in a direction 2262 corresponding to the user's movement 2210.

Figure 23:
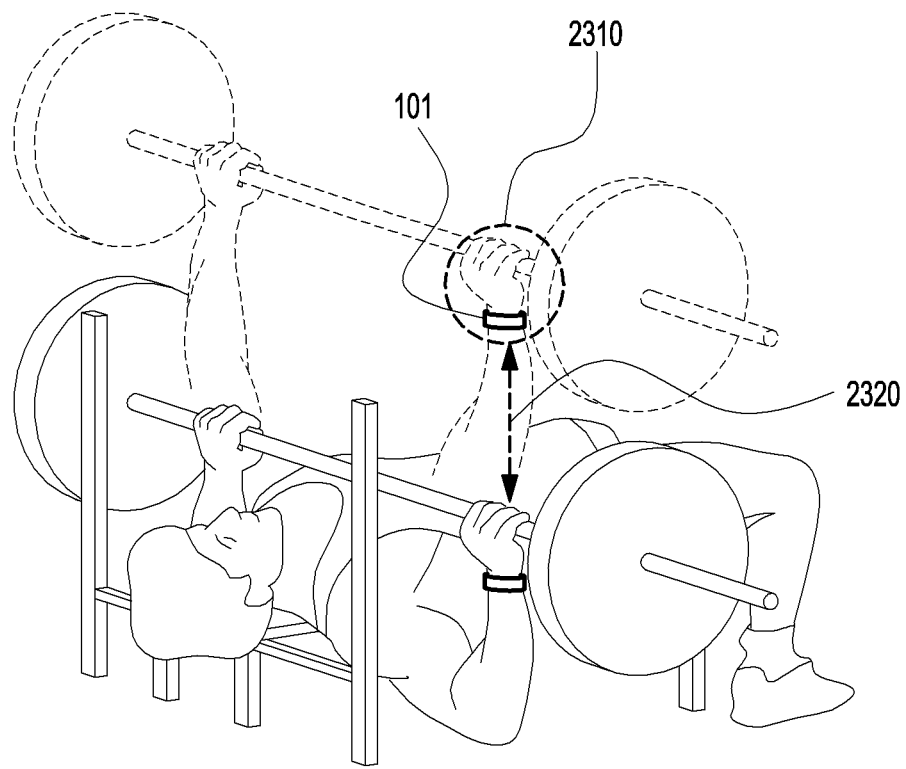
FIG. 23 is an illustration of an electronic device controlling a flexible display according to an embodiment.

FIG. 23 is an illustration of an example in which the electronic 101 device controls a flexible display according to an embodiment.

Referring to FIG. 23, a user may wear the electronic device 101 on the wrist of the user's right arm, and the user may exercise with the arms (e.g., perform a bench press).

For example, the electronic device 101 may identify movement information of the electronic device 101 so as to detect whether the user is in a repetitive exercise state with a predetermined pattern. Further, if the user's exercise pattern satisfies a condition of changing and displaying displayed screen information, the electronic device 101 may distinguish and identify a first state 2310 of the user (e.g., a state in which the user has lifted a weight (a hold state)) and a second state 2320 (e.g., a state in which the user is raising a weight (a movement state)). The electronic device 101 may display screen information by performing display control of the flexible display 260 in the first state 2310 by default. In addition, the electronic device 101 may perform display control of the flexible display 260 in the second state 2320 by changing and displaying a display direction or a display position of the screen information, so as to have appropriate visibility corresponding to the movement information of the electronic device 101.

Figure 24:
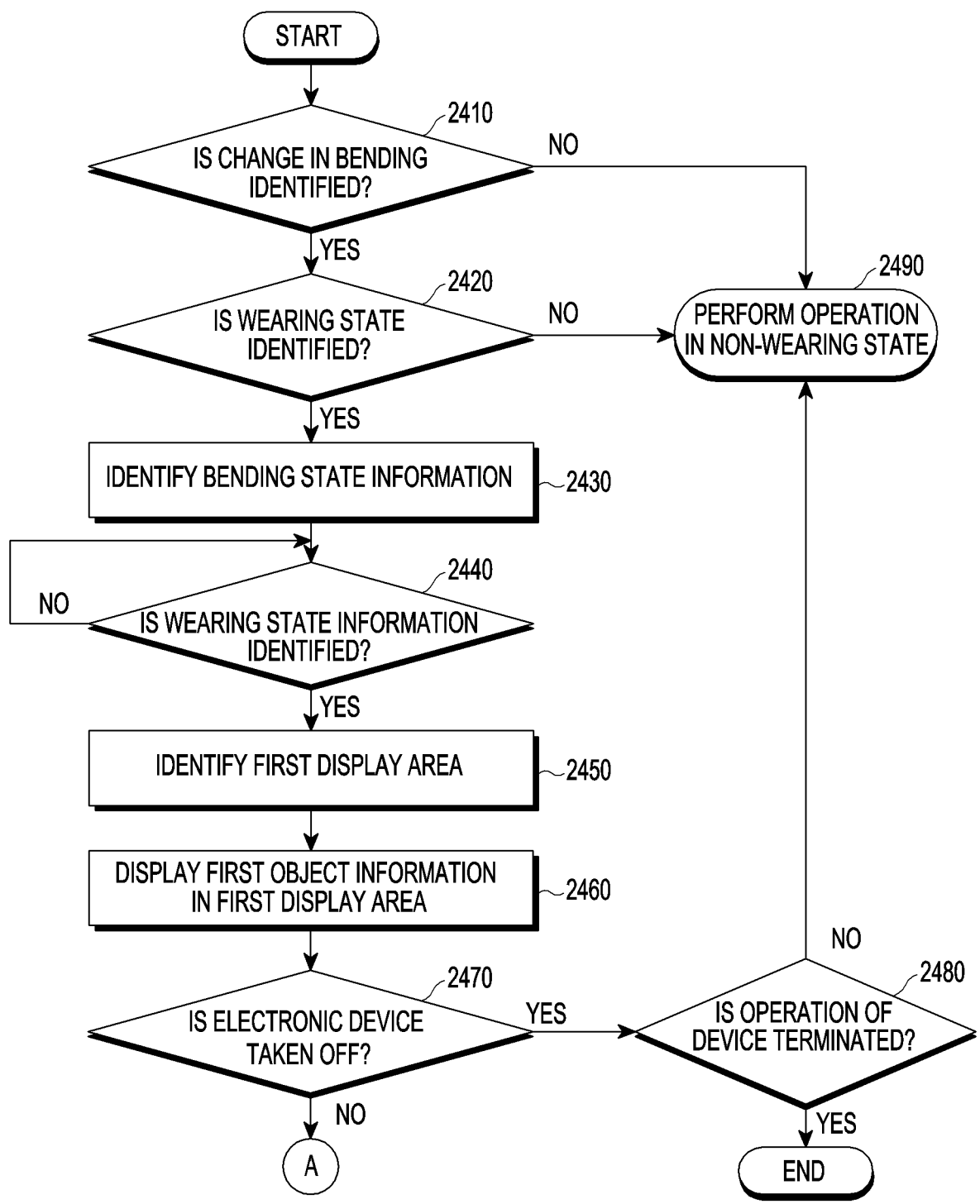
FIG. 24 is a flowchart of a method of controlling a flexible display by an electronic device according to an embodiment.

FIG. 24 is a flowchart 2400 illustrating an operation of controlling a flexible display by an electronic device according to various embodiments.

Referring to FIG. 24, steps 2410, 2420, 2430, 2440, 2450, 2460, 2470, 2480, and 2490 may be implemented through the electronic device 101, the electronic device 102, or the electronic device 104, or the processor 120. The electronic device 101 may store instructions for executing steps 2410 to 2490 in the memory 130. At least one of step 2410 to 2490 may be omitted, the order of some steps may be changed, or another step may be added.

In step 2410, the electronic device 101 may identify whether bending of the electronic device 101 is changed. For example, the electronic device 101 may identify whether bending of the flexible display 260 is changed by using the bending sensor 660. If it is identified that bending of the electronic device 101 is changed, the electronic device 101 may perform step 2420, and if a change in bending is not identified, the electronic device 101 may proceed to step 2490.

In step 2420, the electronic device 101 may identify whether the electronic device 101 is being worn on the user's body. If wearing of the electronic device 101 is identified, the electronic device 101 may perform step 2430. If wearing of the electronic device 101 is not identified, the electronic device 101 may proceed to step 2490.

In step 2430, the electronic device 101 may identify bending state information of the electronic device 101. For example, the electronic device 101 may identify bending state information including area segmentation information of the flexible display 260 corresponding to a bending degree of the flexible display 260, using the bending sensor 660.

In step 2440, the electronic device 101 may identify wearing state information of the electronic device 101. For example, the electronic device 101 may identify wearing state information including a wearing position or a wearing orientation of the electronic device 101 by using the sensor module 176. If the wearing state information of the electronic device 101 is identified, the electronic device 101 may perform step 2450, and if the wearing state information is not identified, the electronic device 101 may be in a standby state and proceed to step 2440 until the wearing state information is identified.

In step 2450, the electronic device 101 may determine a first display area of the flexible display 260, based on the identified wearing state information of the electronic device 101 and/or bending state information of the electronic device 101.

In step 2460, the electronic device 101 may display first object information on the first display area of the flexible display 260.

In step 2470, the electronic device 101 may identify whether the electronic device 101 is taken off of the user. If the electronic device 101 is taken off, the electronic device 101 may perform step 2480, and if the electronic device 101 is not taken off, the electronic device 101 may perform step 1610 in FIG. 16 as a subsequent operation.

In step 2480, the electronic device 101 may identify whether the operation of the electronic device 101 ends. If the operation of the electronic device 101 ends, the electronic device 101 may end display control of the flexible display 260 of the electronic device 101, and if the operation of the electronic device 101 does not end, the electronic device 101 may proceed to step 2490.

In step 2490, the electronic device 101 may perform an operation in a non-wearing state of the electronic device 101. For example, when the electronic device 101 is not worn on the user's body, the flexible display 260 maintains a flat state without bending, and may be used as a general portable terminal. The electronic device 101 may display screen information on the entire area of the flexible display 260 without dividing the area of the flexible display 260.

Figure 25A:
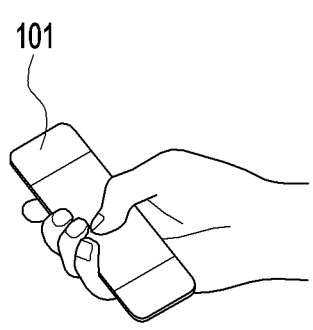
FIG. 25A is an illustration of an electronic device controlling a flexible display according to an embodiment.
Figure 25B:
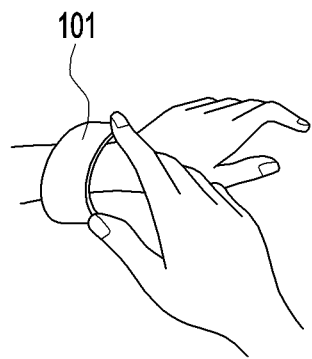
FIG. 25B is an illustration of an electronic device controlling a flexible display according to an embodiment.
Figure 25C:
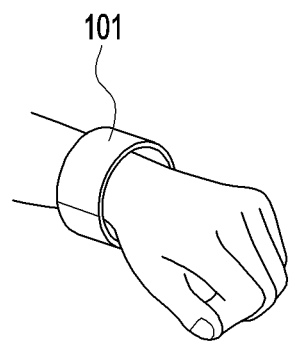
FIG. 25C is an illustration of an electronic device controlling a flexible display according to an embodiment.

FIG. 25A is an illustration of an example in which the electronic device 101 controls a flexible display according to an embodiment. FIG. 25B is an illustration of an example in which the electronic device 101 controls a flexible display according to an embodiment. FIG. 25C is an illustration of an example in which the electronic device 101 controls a flexible display according to an embodiment.

Referring to FIGS. 25A, 25B, and 25C, FIG. 25A illustrates a non-wearing state of the electronic device 101, FIG. 25B illustrates a transition to a non-wearing or wearing state of the electronic device 101, and FIG. 25C illustrates a wearing state of the electronic device 101.

The electronic device 101 may be used as a general portable electronic device as shown in FIG. 25A when the electronic device 101 is not worn on a user's body. In addition, as shown in FIG. 25B, the electronic device 101 may transition to a wearing state from a non-wearing state or may transition to a non-wearing state from a wearing state. In addition, the electronic device 101 may be used as a wearable electronic device as shown in FIG. 25C in the state in which the electronic device 101 is worn on the user's body.

According to an embodiment, an electronic device may include a flexible display; at least one sensor; at least one processor functionally connected to the flexible display and the at least one sensor; and a memory functionally connected to the at least one processor, wherein the memory stores instructions which, when executed, cause the at least one processor to identify wearing state information of the electronic device and/or bending state information of the electronic device by using the at least one sensor; display first object information on a first display area of the flexible display, based at least on the identified wearing state information and/or bending state information; identify a situation change of the electronic device by the at least one sensor; in response to the identification of the situation change, acquire the situation information of the electronic device or posture information of the electronic device by using the at least one sensor; and display second object information on a second display area including at least a partial area of the first display area of the flexible display, based at least on the acquired situation information and/or the posture information.

In the electronic device, the instructions may be configured to cause the at least one processor to identify the wearing state information including at least one of whether the electronic device is being worn, a wearing position on which the electronic device is being worn, or a wearing orientation in which the electronic device is being worn by using the at least one sensor.

In the electronic device, the at least one sensor may include at least one of a gyro sensor, a magnetic sensor, an acceleration sensor, a proximity sensor, or a biometric sensor.

In the electronic device, the at least one sensor may further include a bending sensor configured to measure a bending degree of the flexible display, wherein the instructions may be configured to cause the at least one processor to identify bending state information including area segmentation information of the flexible display corresponding to a bending degree of the flexible display measured by using the bending sensor.

In the electronic device, the bending sensor may include at least one of a flex sensor, a pressure sensor, a plurality of gyro sensors, a plurality of acceleration sensors, or a Hall effect IC sensor.

In the electronic device, the instructions may be configured to cause the at least one processor to determine (e.g., identify) the first display area among segmented areas of the flexible display, based on the wearing state information and the bending state information.

In the electronic device, the instructions may be configured to cause the at least one processor to identify the situation information based on a pattern or learning of sensor data obtained by using the at least one sensor; and when it is identified that a previous situation changes to a preconfigured situation based on the identified situation information, identify the posture information including a vertical vector of the flexible display by using the at least one sensor.

In the electronic device, the situation information may include at least one of stopping, walking, running, riding a bicycle, driving a vehicle, or exercise using the arms.

In the electronic device, the instructions may be configured to cause the at least one processor to identify the posture information when it is identified that the changed situation is maintained for a preconfigured time based on the situation information of the electronic device.

In the electronic device, the instructions may be configured to cause the at least one processor to determine a second display area within the first display area of the flexible display based on the situation information and the posture information.

In the electronic device, the instructions may be configured to cause the at least one processor to activate the first display area or the second display area among the segmented areas of the flexible display, and deactivate a third display area different from the first display area and the second display area among the segmented areas of the flexible display.

In the electronic device, the instructions may be configured to cause the at least one processor to identify the area size information of the first display area or the second display area of the flexible display by using the bending sensor; and change and display the first object information or the second object information based on the identified area size information of the first display area or the second display area.

In the electronic device, the instructions may be configured to cause the at least one processor to identify movement information of the electronic device by using the at least one sensor; and change and display the first object information or the second object information based on the identified movement information.

According to an embodiment, a storage medium may have instructions stored therein, and when executed by at least one circuit, the instructions may be configured to cause the at least one circuit to perform at least one operation, wherein the at least one operation may include identifying wearing state information of an electronic device and/or bending state information of the electronic device by using the at least one sensor; displaying first object information on a first display area of the flexible display, based on at least the identified wearing state information and/or bending state information; identifying a situation change of the electronic device by the at least one sensor; in response to the identification of the situation change, acquiring situation information of the electronic device or posture information of the electronic device by using the at least one sensor; and displaying second object information on a second display area including at least a partial area of the first display area of the flexible display, based on at least the acquired situation information and/or the posture information.

In the storage medium, the at least one operation may further include identifying the wearing state information including at least one of whether the electronic device is worn, a wearing position on which the electronic device is being worn, or a wearing orientation in which the electronic device is being worn, using the at least one sensor. In the storage medium, the at least one sensor may further include a bending sensor configured to measure bending state information of the flexible display, and the at least one operation may further include identifying the bending state information including area segmentation information of the flexible display, corresponding to a bending degree of the flexible display, using the bending sensor.

In the storage medium, the at least one operation may include identifying the situation information based on a pattern or learning of collected sensor data, using the at least one sensor; and when it is identified that a previous situation changes to a preconfigured situation based on the identified situation information, identifying the posture information including the vertical vector of the flexible display by using the at least one sensor.

In the storage medium, the at least one operation may further include determining the first display area among segmented areas of the flexible display, based on the wearing state information and the bending state information; and determining a second display area within the first display area of the flexible display, based on the situation information and the posture information.

In the storage medium, the at least one operation may further include changing and displaying the first object information or the second object information, based on at least area size information of the first display area or the second display area of the flexible display, and/or movement information of the electronic device.

According to an embodiment, a method for controlling a flexible display may include identifying wearing state information of the electronic device and/or bending state information of the electronic device by using the at least one sensor; displaying first object information on a first display area of the flexible display, based on at least the identified wearing state information and/or bending state information; identifying a situation change of the electronic device by the at least one sensor; in response to the identification of the situation change, acquiring the situation information of the electronic device or posture information of the electronic device by using the at least one sensor; and displaying second object information on a second display area including at least a partial area of the first display area of the flexible display, based on at least the acquired situation information and/or the posture information.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a flexible display;
   at least one sensor;
   at least one processor functionally connected to the flexible display and the at least one sensor; and
   a memory functionally connected to the at least one processor,
   wherein the memory is configured to store instructions which, when executed, cause the at least one processor to:
      identify wearing state information of the electronic device and/or bending state information of the electronic device by using the at least one sensor;
      display first object information on a first display area of the flexible display, based on at least the identified wearing state information and/or bending state information;
      identify a situation change of the electronic device by the at least one sensor;
      in response to identifying the situation change, acquire situation information of the electronic device or posture information of the electronic device by using the at least one sensor;
      display second object information on a second display area comprising at least a partial area of the first display area of the flexible display, based on at least the acquired situation information and/or the posture information,
      identify the situation information based on a pattern or learning of sensor data obtained by using the at least one sensor, and
      when it is identified that a previous situation changes to a preconfigured situation based on the identified situation information, identify the posture information comprising a vertical vector of the flexible display by using the at least one sensor.

2. The electronic device of claim 1, wherein the memory is further configured to store instructions which, when executed, cause the at least one processor to identify the wearing state information comprising at least one of whether the electronic device is being worn, a wearing position on which the electronic device is being worn, or a wearing orientation in which the electronic device is being worn, using the at least one sensor.

3. The electronic device of claim 2, wherein the at least one sensor comprises at least one of a gyro sensor, a magnetic sensor, an acceleration sensor, a proximity sensor, and a biometric sensor.

4. The electronic device of claim 1, wherein the at least one sensor comprises a bending sensor configured to measure a bending degree of the flexible display, and
the memory is further configured to store instructions which, when executed, cause the at least one processor to identify area segmentation information of the flexible display corresponding to the bending degree of the flexible display measured by using the bending sensor, wherein the bending state information comprises the area segmentation information of the flexible display.

5. The electronic device of claim 4, wherein the bending sensor comprises at least one of a flex sensor, a pressure sensor, a gyro sensor, an acceleration sensor, and a Hall effect integrated circuit (IC) sensor.

6. The electronic device of claim 1, wherein the memory is further configured to store instructions which, when executed, cause the at least one processor to identify the first display area among segmented areas of the flexible display, based on the wearing state information and the bending state information.

7. The electronic device of claim 1, wherein the situation information comprises at least one of stopping, walking, running, riding a bicycle, driving a vehicle, and exercise using an arm.

8. The electronic device of claim 1, wherein the memory is further configured to store instructions which, when executed, cause the at least one processor to identify the posture information when it is identified that a situation changed based on the situation information of the electronic device is maintained for a preconfigured time.

9. The electronic device of claim 1, wherein the memory is further configured to store instructions which, when executed, cause the at least one processor to identify the second display area within the first display area of the flexible display, based on the situation information and the posture information.

10. The electronic device of claim 6, wherein the memory is further configured to store instructions which, when executed, cause the at least one processor to activate the first display area or the second display area among the segmented areas of the flexible display, and deactivate a third display area different from the first display area and the second display area among the segmented areas.

11. The electronic device of claim 4, wherein the memory is further configured to store instructions which, when executed, cause the at least one processor to:
identify area size information of the first display area or the second display area of the flexible display by using the bending sensor; and
change and display the first object information or the second object information, based on the identified area size information of the first display area or the second display area.

12. The electronic device of claim 1, wherein the memory is further configured to store instructions which, when executed, cause the at least one processor to:
identify movement information of the electronic device by using the at least one sensor; and
change and display the first object information or the second object information, based on the identified movement information.

13. A non-transitory storage medium storing instructions which, when executed by at least one circuit, are configured to cause the at least one circuit to perform at least one operation comprising:
identifying wearing state information of an electronic device and/or bending state information of the electronic device by using at least one sensor;
displaying first object information on a first display area of a flexible display, based on at least the identified wearing state information and/or bending state information;
identifying a situation change in the electronic device by the at least one sensor;
in response to identifying the situation change, acquiring situation information of the electronic device or posture information of the electronic device by using the at least one sensor;
displaying second object information on a second display area comprising at least a partial area of the first display area of the flexible display, based on at least the acquired situation information and/or the posture information;
identifying the situation information based on a pattern or learning of sensor data obtained by using the at least one sensor; and
when it is identified that a previous situation changes to a preconfigured situation based on the identified situation information, identifying the posture information comprising a vertical vector of the flexible display by using the at least one sensor.

14. The non-transitory storage medium of claim 13, wherein the at least one operation further comprises identifying the wearing state information comprising at least one of whether the electronic device is being worn, a wearing position on which the electronic device is being worn, and a wearing orientation in which the electronic device is being worn, using the at least one sensor.

15. The non-transitory storage medium of claim 13, wherein the at least one sensor comprises a bending sensor configured to measure bending state information of the flexible display, and
the at least one operation further comprises identifying area segmentation information of the flexible display corresponding to a bending degree of the flexible display, using the bending sensor, wherein the bending state information comprises the area segmentation information of the flexible display.

16. The non-transitory storage medium of claim 13, wherein the at least one operation further comprises:
identifying the first display area among segmented areas of the flexible display, based on the wearing state information and the bending state information; and
identifying the second display area within the first display area of the flexible display, based on the situation information and the posture information.

17. The non-transitory storage medium of claim 13, wherein the at least one operation further comprises changing and displaying the first object information or the second object information, based on at least area size information of the first display area or the second display area of the flexible display, and/or movement information of the electronic device.

18. A method for controlling a flexible display, comprising:
- identifying wearing state information of an electronic device and/or bending state information of the electronic device by using at least one sensor;
- displaying first object information on a first display area of the flexible display, based on at least the identified wearing state information and/or bending state information;
- identifying a situation change of the electronic device by the at least one sensor;
- in response to identifying the situation change, acquiring situation information of the electronic device or posture information of the electronic device by using the at least one sensor;
- displaying second object information on a second display area comprising at least a partial area of the first display area of the flexible display, based on at least the acquired situation information and/or the posture information;
- identifying the situation information based on a pattern or learning of sensor data obtained by using the at least one sensor; and
- when it is identified that a previous situation changes to a preconfigured situation based on the identified situation information, identifying the posture information comprising a vertical vector of the flexible display by using the at least one sensor.

* * * * *